(12) United States Patent
Fox et al.

(10) Patent No.: US 10,118,325 B2
(45) Date of Patent: Nov. 6, 2018

(54) VEHICLE TRIM COMPONENT

(71) Applicant: Shanghai Yanfeng Jinqiao Automotive Trim Systems Co. Ltd., Novi, MI (US)

(72) Inventors: Bart W. Fox, Zeeland, MI (US); Jeffrey A. Deyoung, Holland, MI (US); Tony M. Pokorzynski, Holland, MI (US)

(73) Assignee: Shanghai Yanfeng Jinqiao Automotive Trim Systems Co. Ltd., Novi, MI (US)

( * ) Notice: Subject to any disclaimer, the term of this patent is extended or adjusted under 35 U.S.C. 154(b) by 0 days.

(21) Appl. No.: 14/808,938

(22) Filed: Jul. 24, 2015

(65) Prior Publication Data

US 2015/0328809 A1   Nov. 19, 2015

Related U.S. Application Data

(60) Division of application No. 13/846,529, filed on Mar. 18, 2013, now Pat. No. 9,149,961, which is a
(Continued)

(51) Int. Cl.
*B29C 45/00* (2006.01)
*B29C 43/02* (2006.01)
(Continued)

(52) U.S. Cl.
CPC .......... *B29C 45/0005* (2013.01); *B29C 43/02* (2013.01); *B29C 43/361* (2013.01);
(Continued)

(58) Field of Classification Search
CPC ................................................. B29C 45/0005
See application file for complete search history.

(56) References Cited

U.S. PATENT DOCUMENTS

| 2,903,388 A | 9/1959 | Jonke et al. |
| 4,015,872 A | 4/1977 | Loznak et al. |

(Continued)

FOREIGN PATENT DOCUMENTS

| CA | 939473 A1 | 1/1974 |
| CA | 977113 A1 | 11/1975 |

(Continued)

OTHER PUBLICATIONS

International Search Report for International Application No. PCT/US2012/052534 dated Feb. 19, 2013.
(Continued)

*Primary Examiner* — Larry Thrower
(74) *Attorney, Agent, or Firm* — Christopher G. Darrow; Darrow Mustafa PC

(57) ABSTRACT

A method of manufacturing a vehicle trim component is provided that includes disposing a fiber panel onto a first surface of a mold cavity. The method also includes compressing the fiber panel between the first surface and a second surface of the mold cavity to form the fiber panel into a desired shape. The method further includes injecting resin into the mold cavity to fill at least one void between the first surface and the second surface adjacent to the fiber panel.

20 Claims, 16 Drawing Sheets

Related U.S. Application Data continuation of application No. 13/595,741, filed on Aug. 27, 2012, now Pat. No. 8,939,745.

(60) Provisional application No. 61/528,832, filed on Aug. 30, 2011.

(51) Int. Cl.

| | | |
|---|---|---|
| *B29C 43/36* | (2006.01) | |
| *B29C 43/40* | (2006.01) | |
| *B32B 3/26* | (2006.01) | |
| *B32B 7/04* | (2006.01) | |
| *B29L 31/30* | (2006.01) | |
| *B29C 45/14* | (2006.01) | |
| *B29C 43/14* | (2006.01) | |
| *B29C 43/18* | (2006.01) | |
| *B29C 43/32* | (2006.01) | |
| *B29K 105/08* | (2006.01) | |

(52) U.S. Cl.
CPC ........ *B29C 43/40* (2013.01); *B29C 45/14786* (2013.01); *B32B 3/266* (2013.01); *B32B 7/04* (2013.01); *B29C 43/146* (2013.01); *B29C 43/183* (2013.01); *B29C 45/1418* (2013.01); *B29C 45/14336* (2013.01); *B29C 2043/325* (2013.01); *B29C 2043/3663* (2013.01); *B29C 2043/3665* (2013.01); *B29C 2045/14901* (2013.01); *B29C 2045/14909* (2013.01); *B29K 2105/08* (2013.01); *B29L 2031/302* (2013.01); *B29L 2031/3014* (2013.01); *B29L 2031/3041* (2013.01); *Y10T 428/192* (2015.01); *Y10T 428/2481* (2015.01); *Y10T 428/24273* (2015.01); *Y10T 428/24331* (2015.01); *Y10T 428/24339* (2015.01)

(56) References Cited

U.S. PATENT DOCUMENTS

| | | | |
|---|---|---|---|
| 4,124,242 | A | 11/1978 | Canner |
| 4,576,560 | A | 3/1986 | Herman |
| 4,766,025 | A | 8/1988 | Sanok et al. |
| 4,959,004 | A | 9/1990 | Nowakowski |
| 5,091,131 | A | 2/1992 | Schumacher et al. |
| 5,370,518 | A | 12/1994 | Sasaki et al. |
| 5,372,767 | A | 12/1994 | Zimmermann et al. |
| 5,679,301 | A | 10/1997 | Miklas et al. |
| 5,756,406 | A * | 5/1998 | Rittman ............ B29C 43/183 442/117 |
| 5,804,117 | A | 9/1998 | Baba et al. |
| 5,902,533 | A | 5/1999 | Munger et al. |
| 5,968,437 | A | 10/1999 | Harada |
| 5,968,439 | A | 10/1999 | Grove |
| 6,439,871 | B1 | 8/2002 | Saito et al. |
| 6,537,669 | B1 | 3/2003 | Kaufmann |
| 6,685,863 | B1 | 2/2004 | Yabushita et al. |
| 6,739,856 | B2 | 5/2004 | Cesano |
| 6,756,003 | B2 | 6/2004 | Kieltyka et al. |
| 6,893,247 | B2 | 5/2005 | Uytterhaeghe et al. |
| 7,186,105 | B2 | 3/2007 | Cesano |
| 7,241,412 | B2 | 7/2007 | Cesano |
| 8,939,745 | B2 | 1/2015 | Fox et al. |
| 9,149,961 | B2 | 10/2015 | Fox et al. |
| 2007/0290542 | A1 | 12/2007 | Wada |
| 2008/0292851 | A1 | 11/2008 | Egerer et al. |
| 2009/0226676 | A1* | 9/2009 | Smith ............ B29C 45/1418 428/195.1 |
| 2010/0032080 | A1 | 2/2010 | Nilsrud et al. |
| 2013/0229024 | A1 | 9/2013 | Schidan et al. |

FOREIGN PATENT DOCUMENTS

| | | |
|---|---|---|
| CA | 1138161 A1 | 12/1982 |
| CA | 1239336 A1 | 7/1988 |
| CA | 1258561 A1 | 8/1989 |
| CA | 2013848 A1 | 10/1990 |
| CA | 2018966 A1 | 12/1990 |
| CA | 2020235 A1 | 12/1990 |
| CA | 2018882 A1 | 2/1991 |
| CA | 2035921 A1 | 9/1991 |
| CA | 1291603 | 11/1991 |
| CA | 2085478 A1 | 1/1992 |
| CA | 1314366 | 3/1993 |
| CA | 1318502 | 6/1993 |
| CA | 2137347 A1 | 3/1994 |
| CA | 2143004 A1 | 6/1994 |
| CA | 2119694 A1 | 9/1994 |
| CA | 2156050 A1 | 9/1994 |
| CA | 2156061 A1 | 9/1994 |
| CA | 2168221 A1 | 2/1995 |
| CA | 2187446 A1 | 8/1996 |
| CA | 2175309 A1 | 11/1996 |
| CA | 2223779 A1 | 12/1996 |
| CA | 2318251 A1 | 7/1999 |
| CA | 2318554 A1 | 7/1999 |
| CA | 2269308 A1 | 10/1999 |
| CA | 2334853 A1 | 12/1999 |
| CA | 2317301 A1 | 3/2001 |
| CA | 2400641 A1 | 8/2001 |
| CA | 2341002 A1 | 9/2001 |
| CA | 2322343 A1 | 4/2002 |
| CA | 2424081 A1 | 4/2002 |
| CA | 2380114 A1 | 10/2003 |
| CA | 2509350 A1 | 6/2004 |
| CA | 2528219 A1 | 12/2004 |
| CA | 2557584 A1 | 9/2005 |
| CA | 2570816 A1 | 1/2006 |
| CA | 2570831 A1 | 1/2006 |
| CA | 2589120 A1 | 6/2006 |
| CA | 2591390 A1 | 7/2006 |
| CA | 2602166 A1 | 9/2006 |
| CA | 2568770 A1 | 6/2007 |
| CA | 2634260 A1 | 7/2007 |
| CA | 2648601 A1 | 10/2007 |
| CA | 2647317 A1 | 11/2007 |
| CA | 2647658 A1 | 11/2007 |
| CA | 2651595 A1 | 11/2007 |
| CA | 2653322 A1 | 12/2007 |
| CA | 2658572 A1 | 5/2008 |
| CA | 2672235 A1 | 7/2008 |
| CA | 2674316 A1 | 7/2008 |
| CA | 2674390 A1 | 7/2008 |
| CA | 2674457 A1 | 7/2008 |
| CA | 2675855 A1 | 7/2008 |
| CA | 2689506 A1 | 12/2008 |
| CA | 2695245 A1 | 2/2009 |
| CA | 2733552 A1 | 2/2009 |
| CA | 2707083 A1 | 7/2009 |
| CA | 2756724 A1 | 10/2010 |
| CA | 2757214 A1 | 10/2010 |
| CA | 2772425 A1 | 4/2011 |
| CA | 2802119 A1 | 12/2011 |
| CA | 2847272 A1 | 3/2013 |
| CN | 101336157 A | 12/2008 |
| DE | 2122581 A1 | 11/1972 |
| DE | 3614533 A1 | 11/1987 |
| DE | 10052693 | 5/2001 |
| DE | 102004054228 A1 | 6/2006 |
| DE | 102006000657 A1 | 7/2007 |
| DE | 102009055983 | 6/2011 |
| DE | 102006000657 B4 | 9/2014 |
| EP | 1986835 B1 | 1/2011 |
| FR | 2445208 | 7/1980 |
| JP | H07195372 A | 8/1995 |
| JP | H08142059 A | 6/1996 |
| JP | 2004314501 A | 11/2004 |
| JP | 2008012838 A | 1/2008 |
| JP | 2008254438 A | 10/2008 |
| JP | 2010047207 A | 3/2010 |

(56) References Cited

FOREIGN PATENT DOCUMENTS

| WO | 9902321 A1 | 1/1999 |
|---|---|---|
| WO | 2013033024 A2 | 3/2013 |
| WO | 2016077773 A1 | 5/2016 |

OTHER PUBLICATIONS

Written Opinion of the International Searching Authority for International Application No. PCT/US2012/052534 dated Feb. 19, 2013.
International Search Report for International Application No. PCT/US2015/060710 dated Jan. 29, 2016.
Written Opinion of the International Searching Authority for International Application No. PCT/US2015/060710 dated Jan. 29, 2016.
International Preliminary Report on Patentability for International Application No. PCT/US2012/052534 dated Mar. 13, 2014.
International Search Report and Written Opinion for International Application No. PCT/US2012/052534 dated Feb. 19, 2013.
PCT Invitation to Pay Additional Fees and Communication Relating to the Results of the Partial International Search for International Application No. PCT/US2012/052534 dated Nov. 9, 2012.
Contents of Global Dossier/File History of European Patent Application Publication No. EP 3192636 A1 (European Patent Application No. 17158656.3) available at European Patent Register (register.epo.org/application?number=EP17158656 accessed on Jan. 23, 2018) (131 pages total).
English translation of European Patent No. EP 1986835 B1 (translation available at Google Patents www.google.com/patents/EP1986835B1?cl=en accessed on Jan. 23, 2018) (5 pages total).
Contents of Global Dossier/File History for Chinese Patent Application No. CN201280026371 (Translated materials) available at USPTO Global Dossier (globaldossier.uspto.gov/#/details/CN/201280026371/A/83283 accessed on Mar. 12, 2018) (21 pages total).
Materials from website/Internet: "Kante inbegriffen—One-Shot Hybridtechnik" http://www.frimo.com/de/news/frimo-unsere-news/anzeigen/kante-inbegrifen-one-shot-hybridtechnik.html (Date accessed Oct. 21, 2016).
Materials from website/Internet: "ZF erhält Composite Innovations Award 2011 für ein Leichtbau-Bremspedal" http://www.lightweight-design.de/index.php;do=show/site=lwd/sid=1630548824562f52b361d6a485111468/alloc=135/id=13987 (Date accessed Oct. 21, 2016).
Materials from website/Internet: "Presseinformationen FiberForm—Umformen and Hinterspritzen von Organoblechen" http://www.kraussmaffei.com/de/presseinformationen/d/FiberForm.html (Date accessed Oct. 21, 2016).
Materials from website/Internet: "Institut für Verbundwerkstoffe GmbH Kaiserslautern" http://www.ivw.uni-kl.de/forschung-entwicklung/projekte/abgeschlossene-projekte-auswahl/spriform/?_sm_au_=IVVMTSs0V1J2D23N (Date !accessed Oct. 21, 2016).
Materials from website/Internet: "Hybrid Molding" http://bond-laminates.com/en/technology/processing-options/hybrid-molding/ (Date accessed Oct. 21, 2016).
Materials from website/Internet: Leichtbauteile spritzgieben http://www.arburg.com/fileadmin/redaktion/mediathek/prospekte/arburg_leichtbau_681228_de/# (Date accessed Oct. 21, 2016).
Materials from website/Internet: "K 2013: Engel and a plastic brake pedal" https://www.youtube.com/watch?7 v=30CJrOrSrt4 (Date accessed Oct. 21, 2016).
Materials from website/Internet: "Frimo: One-Shot Hybridtechnik—Kante inbegriffen" http://www.k-aktuell.de/frimo-one-shot-hybridtechnik-kante-inbegriffen-18956/ (Date accessed Oct. 21, 2016).
Materials from website/Internet: http://news.directindustry.de/press/frimo-group-gmbh/clever-kombiniert-verformen-hinterspritzen-einem-schritt-36161-404953.html (access unavailable Jan. 11, 2016).
Chinese Office Action dated Apr. 14, 2015.
Office Action from the Canadian Intellectual Property Office dated Mar. 26, 2015.
Japanese Office Action dated Mar. 24, 2015.

* cited by examiner

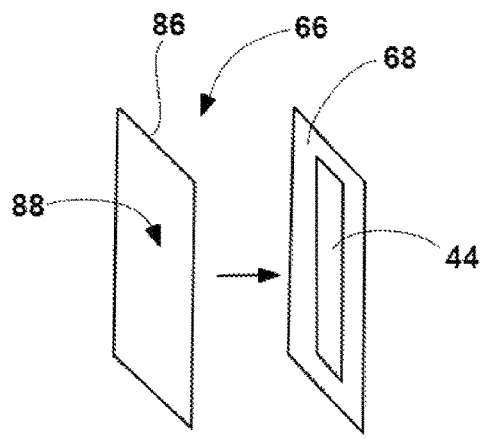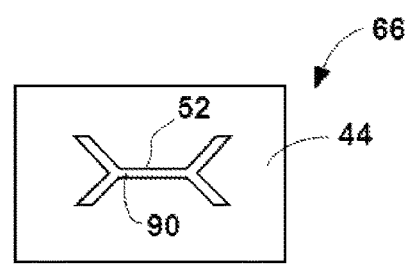
FIG.6  FIG.7
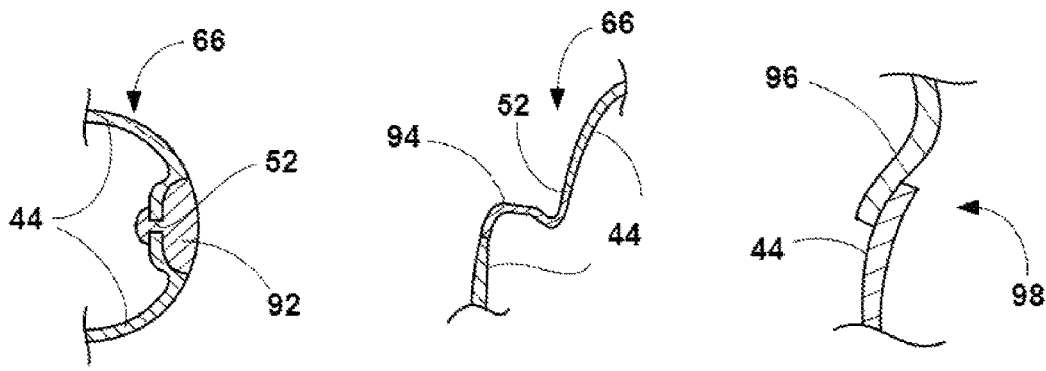
FIG.8  FIG.9  FIG.10

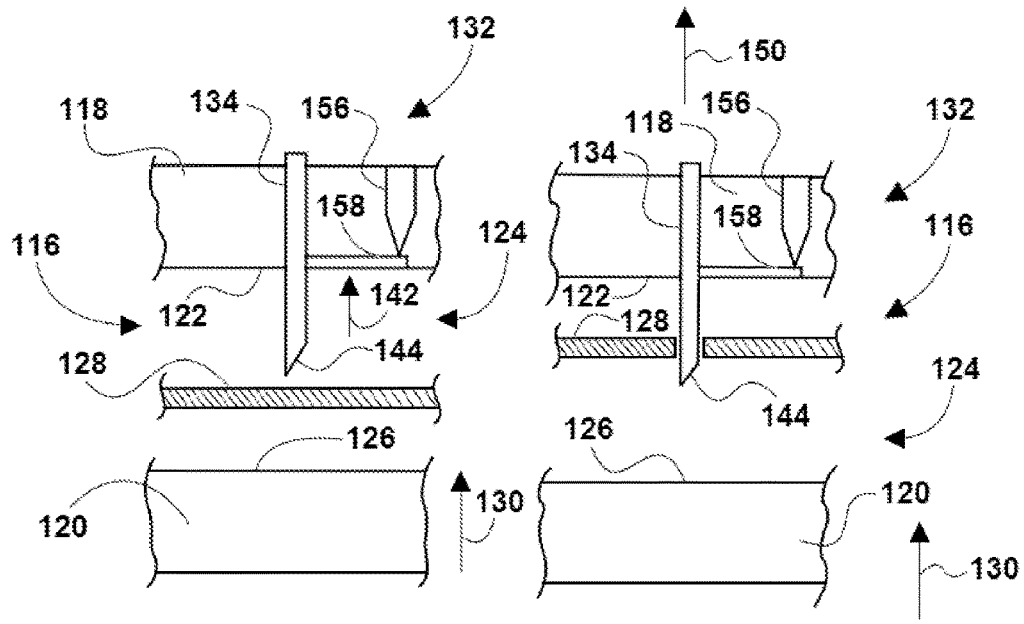
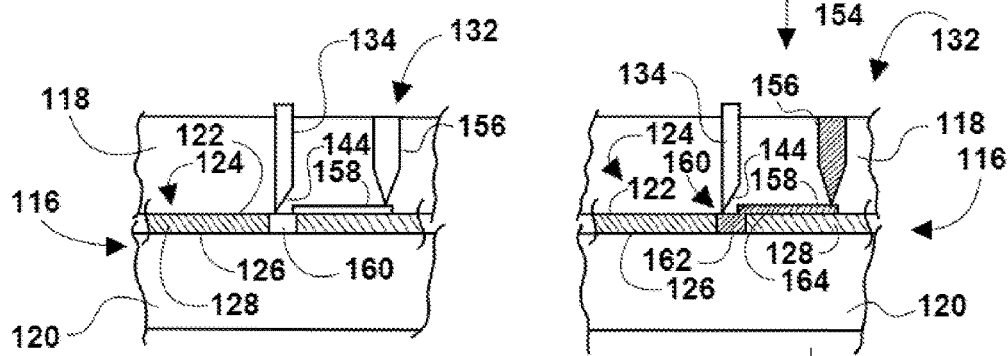
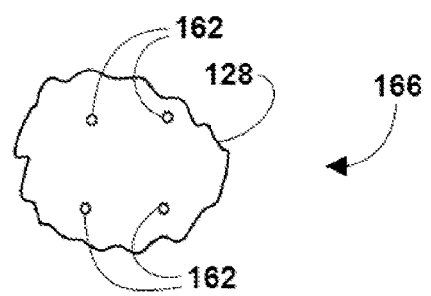

VEHICLE TRIM COMPONENT

CROSS REFERENCE TO RELATED APPLICATION

This application is a divisional of U.S. patent application Ser. No. 13/846,529, entitled "SYSTEM AND METHOD FOR MANUFACTURING A VEHICLE TRIM COMPONENT VIA CONCURRENT COMPRESSION FORMING AND INJECTION MOLDING", filed Mar. 18, 2013, which is a continuation of U.S. patent application Ser. No. 13/595,741, entitled "SYSTEM AND METHOD FOR MANUFACTURING A VEHICLE TRIM COMPONENT VIA CONCURRENT COMPRESSION FORMING AND INJECTION MOLDING", filed Aug. 27, 2012, which claims priority from and the benefit of U.S. Provisional Application Ser. No. 61/528,832, entitled "SYSTEM AND METHOD FOR MANUFACTURING A VEHICLE TRIM COMPONENT VIA CONCURRENT COMPRESSION FORMING AND INJECTION MOLDING", filed Aug. 30, 2011. Each of the foregoing applications is hereby incorporated by reference in its entirety.

BACKGROUND

The invention relates generally to a system and method for manufacturing a vehicle trim component via concurrent compression forming and injection molding.

Certain vehicle trim components are produced by compression forming a fiber panel into a desired shape. For example, certain fiber panels include a combination of structural fibers (e.g., natural and/or synthetic fibers) and thermoplastic resin (e.g., polypropylene (PP), acrylonitrile butadiene styrene (ABS), polycarbonate (PC), etc.). To form a trim component from such a fiber panel, the panel is heated to induce the thermoplastic resin to liquefy. The fiber panel is then placed into a low-temperature mold, and compression molded into a desired shape. As the fiber panel cools, the thermoplastic solidifies, thereby establishing a substantially rigid composite panel. Alternative fiber panels include a combination of structural fibers and a thermoset resin (e.g., epoxy, polyester, etc.). To form a trim component from such a fiber panel, the panel is compressed within a heated mold to form the panel into the desired shape, and to induce curing of the resin. Once the thermoset resin cures, a substantially rigid composite panel is formed.

Once the molding process is complete, the composite panel is removed from the mold, and the edges are trimmed to the desired dimensions. The composite panel is then placed within a second mold to form ancillary components, such as support ribs and/or connectors. For example, the second mold may include a primary cavity configured to receive the trim component, and secondary cavities corresponding to the shape of each ancillary component. In such configurations, liquid resin is injected into each of the additional cavities to form the desired ancillary components. As the resin hardens, the ancillary components bond to the surface of the composite panel, thereby forming a completed trim component. Alternatively, components may be attached to the panel with adhesives and/or mechanical connectors, or rigid components may be pressed into the fiber panel during the compression forming process.

Unfortunately, the process of trimming the composite panel to establish the dimensionally accurate edges is time consuming, and generates a significant amount of offal (i.e., excess material). Moreover, trimming leaves jagged edges that may weaken the composite panel, thereby reducing service life. In addition, transferring the trim component from the first mold to the second mold increases the duration of the manufacturing process. Furthermore, the design and manufacturing costs associated with producing two separate molds increases the setup expenses for the trim component manufacturing process.

BRIEF DESCRIPTION OF THE INVENTION

The present invention relates to a method of manufacturing a vehicle trim component including disposing a fiber panel onto a first surface of a mold cavity. The method also includes compressing the fiber panel between the first surface and a second surface of the mold cavity to form the fiber panel into a desired shape. The method further includes injecting resin into the mold cavity to fill at least one void between the first surface and the second surface adjacent to the fiber panel.

The present invention also relates to a vehicle trim component prepared by a process including disposing a fiber panel onto a first surface of a mold cavity. The process also includes compressing the fiber panel between the first surface and a second surface of the mold cavity to form the fiber panel into a desired shape. The process further includes injecting resin into the mold cavity to fill at least one void between the first surface and the second surface adjacent to the fiber panel.

The present invention further relates to a mold cavity for manufacturing a vehicle trim component including a first surface configured to receive a fiber panel. The mold cavity also includes a second surface configured to compress the fiber panel between the first surface and the second surface to form the fiber panel into a desired shape. The mold cavity further includes at least one fluid pathway configured to inject resin into a void between the first surface and the second surface adjacent to the fiber panel.

In addition, the present invention relates to a mold assembly for manufacturing a vehicle trim component. The mold assembly includes a first mold element configured to receive a fiber panel, and a retractable pin assembly having multiple holding pins configured to penetrate the fiber panel to secure the fiber panel to the first mold element. The mold assembly also includes a second mold element configured to compress the fiber panel between a first surface of the first mold element and a second surface of the second mold element to form the fiber panel into a desired shape. The retractable pin assembly is configured to withdraw the holding pins from the fiber panel prior to or during compression of the fiber panel between the first and second surfaces.

The present invention also relates to a mold assembly for manufacturing a vehicle trim component. The mold assembly includes a first mold element configured to receive a fiber panel, and a second mold element configured to compress the fiber panel between a first surface of the first mold element and a second surface of the second mold element to form the fiber panel into a desired shape. The mold assembly also includes a fluid pathway configured to inject resin onto adjacent inner surfaces of a bent edge of the fiber panel such that the resin extends to a distal end of the bent edge.

The present invention further relates to a mold assembly for manufacturing a vehicle trim component. The mold assembly includes a first mold element and a second mold element configured to be brought together to compress a fiber panel into a desired shape. The mold assembly also includes a trim blade configured to penetrate the fiber panel as the first and second mold elements are brought together to trim the fiber panel to desired dimensions. In addition, the mold assembly includes a floating core assembly coupled to the second mold element, and configured to urge the fiber panel against a surface of the first mold element before the trim blade penetrates the fiber panel.

DRAWINGS

FIG. 6 is a perspective view of an embodiment of a vehicle trim component manufactured by concurrent compression forming and injection molding, showing the process of applying a cover stock.

FIG. 7 is a front view of an embodiment of a vehicle trim component manufactured by concurrent compression forming and injection molding, including a weakened zone configured to facilitate airbag deployment.

FIG. 8 is a cross-sectional view of an embodiment of a vehicle trim component manufactured by concurrent compression forming and injection molding, including a reinforcement element extending through a fiber panel.

FIG. 9 is a cross-sectional view of an embodiment of a vehicle trim component manufactured by concurrent compression forming and injection molding, including a high curvature element formed within a gap in a fiber panel.

FIG. 10 is a cross-sectional view of an embodiment of a vehicle trim component manufactured by concurrent compression forming and injection molding, including a lap joint between a resin component and a fiber panel.

FIG. 15 is a schematic diagram of an embodiment of a mold assembly having a fluid pathway configured to inject resin into a void formed by a holding pin.

FIG. 16 is a schematic diagram of the mold assembly of FIG. 15, in which a fiber panel is secured to a mold element of the mold assembly via a holding pin.

FIG. 17 is a schematic diagram of the mold assembly of FIG. 15, in which the holding pin is retracted.

FIG. 18 is a schematic diagram of the mold assembly of FIG. 15, in which resin is injected into the void formed by the holding pin.

FIG. 19 is a top view of an embodiment of a vehicle trim component formed within a mold cavity having a retractable pin assembly.

DETAILED DESCRIPTION

Figure 1:
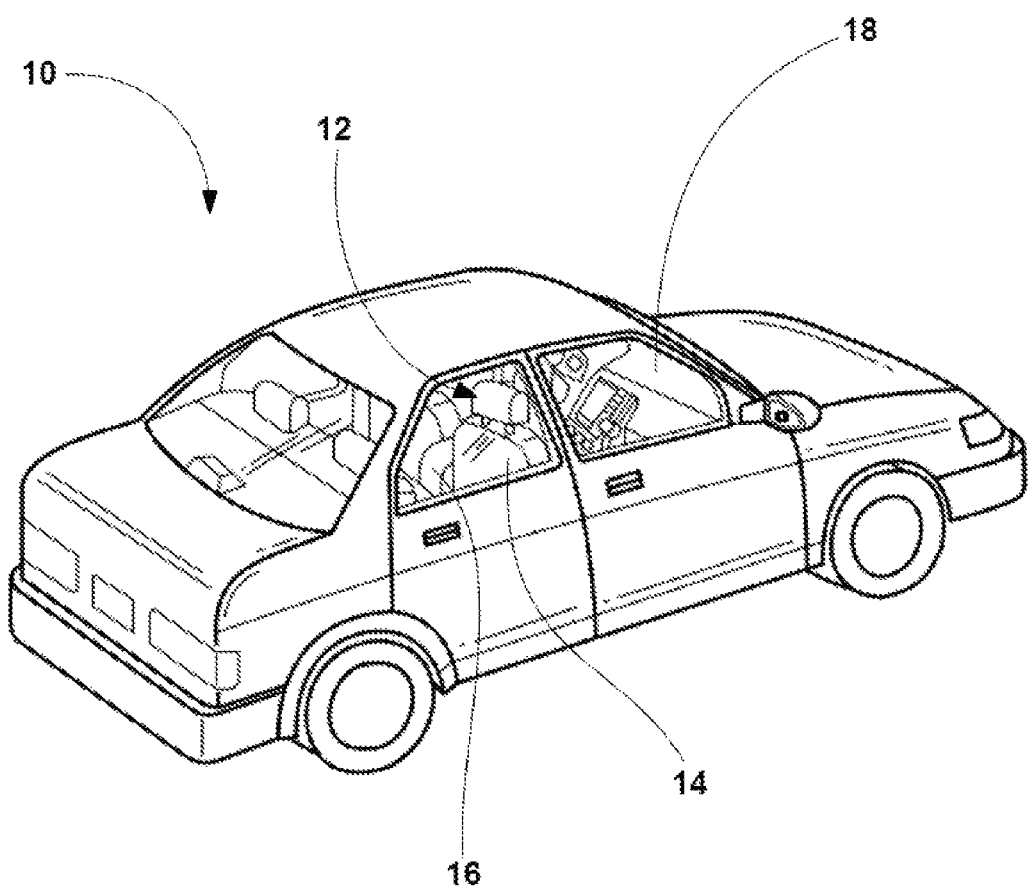
FIG. 1 is a perspective view of an exemplary vehicle that may include a trim component manufactured by a concurrent compression forming and injection molding process.

FIG. 1 is a perspective view of an exemplary vehicle 10 that may include a trim component manufactured by a concurrent compression forming and injection molding process. As illustrated, the vehicle 10 includes an interior 12 having a seat 14, an armrest 16 and a center console 18. As discussed in detail below, certain trim components of the seat 14, the armrest 16, the center console 18 and/or other areas within the interior 12 may be manufactured by a concurrent compression forming and injection molding process. For example, in certain embodiments, a vehicle trim component is prepared by a process including disposing a fiber panel onto a first surface of a mold cavity, and compressing the fiber panel between the first surface and a second surface of the mold cavity to form the fiber panel into a desired shape. Resin is then injected into the mold cavity to fill a void between the first surface and the second surface adjacent to the fiber panel. In certain embodiments, the void extends about a periphery of the fiber panel. In such embodiments, the injected resin will fill the void, and establish a border about the fiber panel as the resin hardens and/or cures. Due to the dimensional accuracy of the mold cavity, each edge of the resultant trim component will substantially correspond to the desired dimensions. As a result, the process of trimming the edges of the component after formation may be obviated, thereby decreasing the duration of the manufacturing process, and reducing the quantity of offal that may otherwise be deposited in a landfill.

In certain embodiments, resin is also injected into at least one secondary void between the fiber panel and the second surface to form an ancillary component of the vehicle trim component. For example, the mold cavity may include multiple secondary voids configured to establish ribs along a surface of the fiber panel. The ribs are configured to support the fiber panel, thereby providing a stronger component, and/or reducing the weight of the component by facilitating a reduction in fiber panel thickness. Because the fiber panel and the ancillary components are formed within a single mold cavity, the process of transferring the part between a compression mold and an injection mold is obviated, thereby reducing the duration of the manufacturing process. In addition, employing a single mold reduces design and manufacturing costs, as compared to producing a first mold for the compression forming process and a second mold for the injection molding process.

Figure 2:
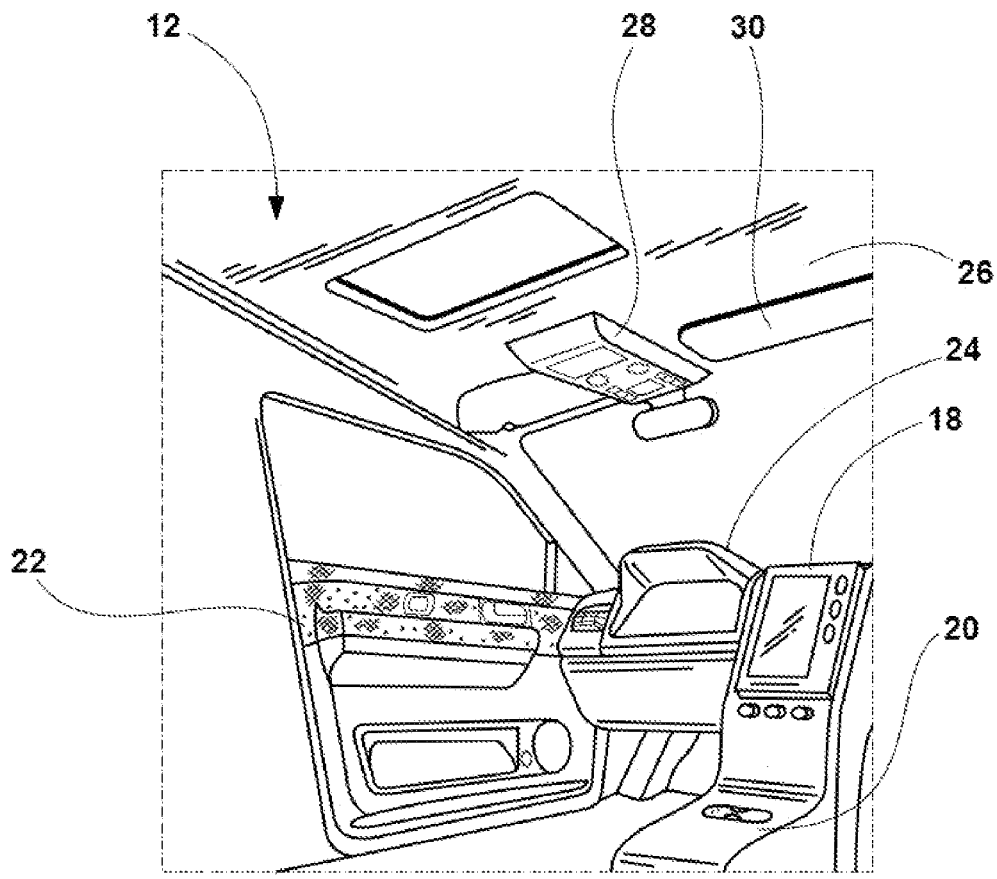
FIG. 2 is a perspective view of a part of the interior of the vehicle of FIG. 1.

FIG. 2 is a perspective view of a part of the interior of the vehicle of FIG. 1. As illustrated, the vehicle interior 12 includes various elements, such as the illustrated center console 18, floor console 20, interior door panel 22, instrument panel 24, headliner 26, overhead console 28 and sun visor 30. As discussed in detail below, each element of the vehicle interior 12 may include one or more trim components manufactured by a combination of compression forming and injection molding. The concurrent compression forming and injection molding process may facilitate formation of a trim component having dimensionally accurate edges, thereby obviating the post-molding trimming process. In addition, by forming the fiber panel and molding certain ancillary components within a single mold cavity, the during of the manufacturing process may be substantially reduced, as compared to processes that include a first compression mold and a second injection mold.

Figure 3:
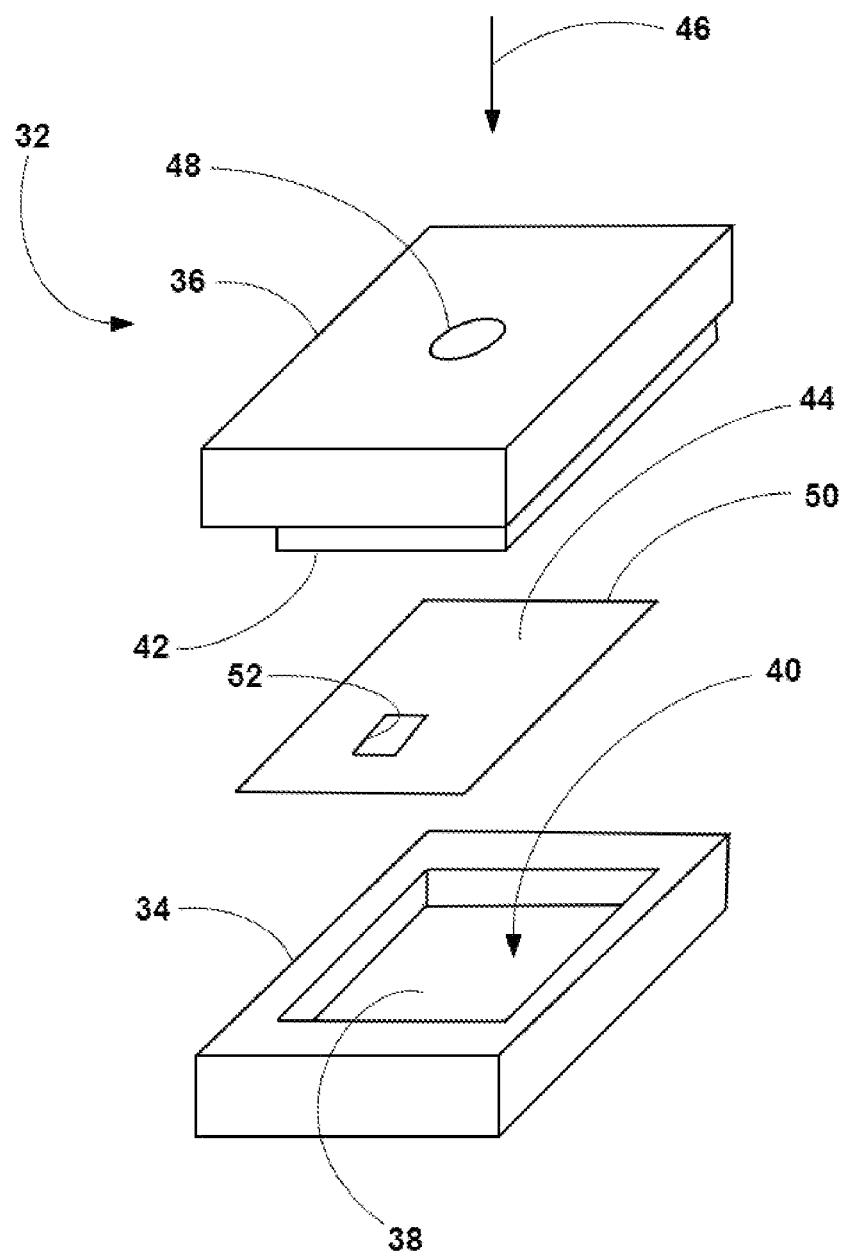
FIG. 3 is a perspective view of an embodiment of a molding assembly configured to produce a trim component via concurrent compression forming and injection molding.

FIG. 3 is a perspective view of an embodiment of a molding assembly 32 configured to produce a trim component via concurrent compression forming and injection molding. In the illustrated embodiment, the molding assembly 32 includes a first (e.g., lower) mold element 34, and a second (e.g., upper) mold element 36. As illustrated, the first mold element 34 includes a first surface 38 defining a first portion of a mold cavity 40, and the second mold element 36 includes a second surface 42 defining a second portion of the mold cavity 40. As discussed in detail below, the first surface 38 is configured to receive a fiber panel 44, and the second surface 42 is configured to compress the fiber panel 44 against the first surface 38 to form the fiber panel 44 into a desired shape.

In certain embodiments, the fiber panel 44 includes a combination of structural fibers and thermoplastic resin. The structural fibers may include natural fibers, such as hemp, wood, flax, kenaf and sisal, and/or synthetic fibers, such as glass fibers, carbon fibers and polymeric fibers. In addition, the thermoplastic resin may include polypropylene (PP), acrylonitrile butadiene styrene (ABS) and/or polycarbonate (PC) binders, for example. By way of example, the fiber panel 44 may be constructed from about 50 percent natural fibers and about 50 percent PP. To facilitate compression forming, the fiber panel 44 is heated (e.g., to about 200 degrees Celsius) to induce the thermoplastic resin to liquefy. The fiber panel 44 is then disposed onto the first surface 38 of the cavity 40, and compressed between the first surface 38 and the second surface 42 as the second mold element 36 is driven toward the first mold element 34 along the direction 46. As the fiber panel 44 cools within the mold assembly 32, the thermoplastic solidifies, thereby establishing a substantially rigid composite panel that conforms to the shape of the mold cavity 40.

In further embodiments, the fiber panel 44 includes a combination of structural fibers and a thermoset resin. Similar to the embodiment described above, the structural fibers may include natural fibers, such as hemp, wood, flax, kenaf and sisal, and/or synthetic fibers, such as glass fibers, carbon fibers and polymeric fibers. In addition, the thermoset resin may include epoxy resin, polyimide resin, polyester resin and/or vinylester resin, for example. By way of example, the fiber panel 44 may be constructed from Fibrowood, which is manufactured by Johnson Controls Technology Company of Holland, Mich. To facilitate compression forming, the fiber panel 44 is disposed onto the first surface 38 of the cavity 40, and compressed between the first surface 38 and the second surface 42 as the second mold element 36 is driven toward the first mold element 34 along the direction 46. During the compression process, the panel 44 is heated (e.g., via a heated mold assembly 32), thereby inducing the thermoset resin to cure. Consequently, a substantially rigid composite panel that conforms to the shape of the mold cavity 40 is formed.

After the fiber panel 44 is compressed between the first surface 38 and the second surface 42, resin is injected into the mold cavity (e.g., via the port 48) to fill at least one void between the first surface 38 and the second surface 42 adjacent to the fiber panel 44. For example, in certain embodiments, the void extends about a periphery 50 of the fiber panel 44. In such embodiments, the injected resin will fill the void, and establish a border about the fiber panel 44 as the resin hardens and/or cures. Due to the dimensional accuracy of the mold cavity, each edge of the resultant trim component will substantially correspond to the desired dimensions. As a result, the process of trimming the edges of the component after formation may be obviated, thereby decreasing the duration of the manufacturing process, and reducing the quantity of offal that may otherwise be deposited in a landfill.

In further embodiments, the void corresponds to a gap 52 within the fiber panel 44. In such embodiments, the resin will fill the gap, thereby establishing a substantially continuous structure. For example, the gap 52 may be configured to establish a weakened zone extending along the interface between the fiber panel 44 and the molded resin within the gap 52. As discussed in detail below, the weakened zone may be configured to facilitate separation of the molded resin from the fiber panel 44, thereby enabling deployment of an airbag, for example. In further embodiments, the resin may fill gaps 52 formed by unintentional tearing of the fiber panel 44 during the compression forming process, thereby forming a trim component having a substantially continuous surface. In addition, the gap 52 may be configured to establish a high curvature region of the trim component. For example, the mold cavity 40 may be contoured to form the fiber panel into a shape having a relatively low curvature, and to form the resin into an element having a high curvature. In this manner, a trim component having a desired shape and structural properties may be formed. While the fiber panel 44 includes a single gap 52 in the illustrated embodiment, it should be appreciated that alternative fiber panels 44 may include additional gaps to establish weakened zones, to fill torn areas of the fiber panel and/or to form high curvature regions of the trim component, for example.

Figure 4:
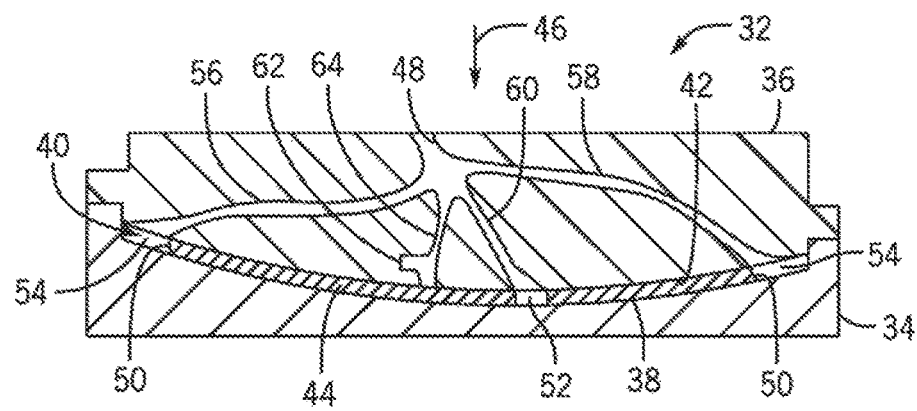
FIG. 4 is a cross-sectional view of an embodiment of a molding assembly in a closed position.

FIG. 4 is a cross-sectional view of an embodiment of a molding assembly 32 in a closed position. In the illustrated embodiment, the mold cavity 40 includes a void 54 extending about the periphery 50 of the fiber panel 44. As previously discussed, resin may be injected into the void 54 to establish a border about the fiber panel 44 as the resin hardens and/or cures. In the illustrated embodiment, the molding assembly 32 includes a first fluid pathway 56 extending between the port 48 and a first portion of the void 54, and a second fluid pathway 58 extending between the port 48 and a second portion of the void 54. In this configuration, when liquid resin is injected into the port 48, the resin will flow into the void 54, thereby establishing a border surrounding the fiber panel 44. The molding assembly 32 also includes a third fluid pathway 60 extending between the port 48 and the gap 52, thereby facilitating resin flow to the gap 52.

In the illustrated embodiment, the mold cavity 40 includes a secondary void 62 positioned between the fiber panel 44 and the second surface 42 of the mold cavity 40. The secondary void 62 is configured to form an ancillary component of the vehicle trim component, such as a support rib or a connector, for example. As illustrated, a fourth fluid pathway 64 extends between the port 48 and the second void 62. In this configuration, when liquid resin is injected into the port 48, the resin will flow into the void 62, thereby establishing the ancillary component as the resin cures and/or hardens.

In operation, a fiber panel 44 is disposed onto the first surface 38 of the mold cavity 40, and the fiber panel 44 is compressed between the first surface 38 and the second surface 42 of the mold cavity 40 to form the fiber panel 44 into the desired shape. As the fiber panel 44 solidifies within the mold cavity 40, resin is injected into the port 48, thereby filling the voids 52, 54 and 62. As the resin cures and hardens, the resin binds to the fiber panel 44, thereby forming a trim component having the desired shape, structural properties and/or ancillary components. In certain embodiments, the resin may include a thermoplastic material, such as polypropylene (PP), acrylonitrile butadiene styrene (ABS) or polycarbonate (PC), or a thermoset material, such as epoxy resin, polyimide resin, polyester resin or vinylester resin. In such embodiments, the resin is injected into the mold in a liquid state, and solidifies as the resin cures/hardens. As a result, resin parts are formed having shapes corresponding to the shapes of the respective voids within the mold cavity 40. In certain embodiments, the injected resin may be molded with a cellular structure (e.g., via a chemical or mechanical blowing agent), to reduce a mass of the trim component and/or to enhance processing properties.

Figure 5:
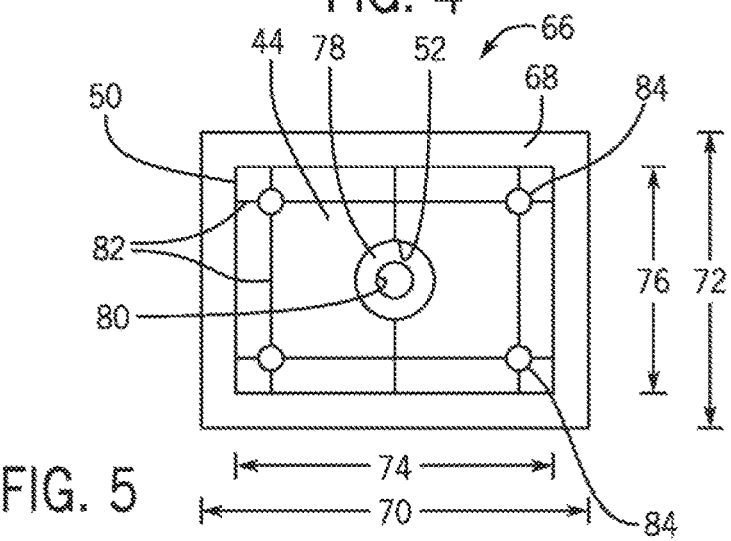
FIG. 5 is a front view of an embodiment of a vehicle trim component manufactured by concurrent compression forming and injection molding.
Figure 5A:
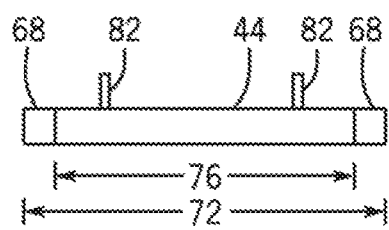
FIGS. 5A to 5D are schematic side elevation views of a component of the type shown in FIG. 5 according to an exemplary embodiment.
Figure 5B:
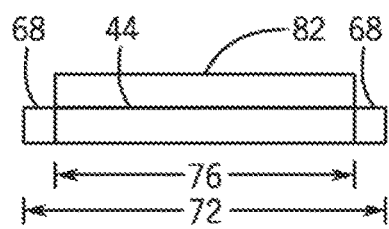
Figure 5C:
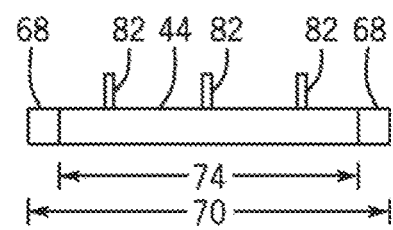
Figure 5D:

FIG. 5 is a front view of an embodiment of a vehicle trim component 66 manufactured by concurrent compression forming and injection molding. See also FIGS. 5A to 5D (schematic side elevation views according to an exemplary embodiment). As illustrated, the trim component 66 includes a fiber panel 44, and a resin border 68 disposed about the periphery 50 of the fiber panel 44. As previously discussed, the dimensional accuracy of the mold cavity 40 facilitates formation of a resin border 68 having desired dimensions, thereby obviating the post-formation panel trimming process. For example, to form a trim component 66 having a width 70 and a length 72, the fiber panel 44 is trimmed to a width 74 smaller than the desired width 70, and to a length 76 smaller than the desired length 72. The fiber panel 44 is then placed within a mold cavity 40 having the desired dimensions (i.e., a width 70 and a height 72). After the panel 44 is compressed between the first surface 38 and the second surface 42, resin is injected into the void 54 surrounding the periphery 50, thereby forming the border 68, and establishing a trim component 66 having the desired dimensions.

Because the fiber panel 44 is trimmed prior to the compression forming process, the offal (i.e., excess material) may be recycled. In contrast, recycling post-formation offal may be more difficult because the thermoset resin within the fiber panel has cured/hardened, and/or the thermoplastic resin has bonded to the structural fibers. In addition, because the resin fills the void between the periphery 50 of the fiber panel 44 and the edges of the mold cavity 40, the edges of the trim component 66 may be dimensionally accurate despite variations in the fiber panel edges. Consequently, the edges of the fiber panel may be trimmed to rough dimensions prior to the compression forming process, thereby substantially reducing the duration associated with fiber panel trimming.

In the illustrated embodiment, the trim component 66 includes a resin feature 78 formed within the gap 52 of the fiber panel. As illustrated, the feature 78 includes an opening 80 having dimensionally accurate edges. To form the opening 80, the mold cavity 40 includes a protrusion having the shape of the opening 80. As resin is injected into the gap 52, the protrusion blocks the flow of resin to the opening 80, thereby establishing the desired feature 78. As will be appreciated, the feature 78 may be utilized to secure other components to the trim component 66, and/or to secure the trim component 66 to the vehicle interior 12. Furthermore, while a substantially hexagonal opening 80 is employed within the illustrated embodiment, it should be appreciated that alternative embodiments may include other opening configurations (e.g., square, circular, elliptical, etc.). In addition, it should be appreciated that further embodiments may include additional features 78 distributed throughout the fiber panel 44. Because the feature 78 is formed during the concurrent compression forming/injection molding process, the practice of applying a feature to the fiber panel after formation is obviated. As a result, the duration and expense associated with trim component manufacturing may be substantially reduced.

The illustrated trim component 66 also includes ancillary components coupled to the surface of the fiber panel 44. As previously discussed, such ancillary components may be formed by injecting resin into a secondary void between the fiber panel and the second surface of the mold cavity. In the illustrated embodiment, the ancillary components include ribs 82, and connectors 84. However, it should be appreciated that alternative embodiments may include other ancillary components, such as pins, mounts, etc. The connectors 84 are configured to facilitate coupling between the trim component 66 and another surface (e.g., door frame, instrument panel support structure, etc.) within the interior 12 of the vehicle 10. The ribs 82 are configured to support the fiber panel 44, thereby providing a stronger trim component, and/or reducing the weight of the trim component by facilitating a reduction in fiber panel thickness. In certain embodiments, the ribs 82 may extend across the interface between the fiber panel 44 and the border 68, and/or across the interface between the fiber panel 44 and the resin feature 78. In such embodiments, the ribs 82 may enhance the strength of the panel/border interface and/or the panel/feature interface. Because the fiber panel and the ancillary components are formed within a single mold cavity, the process of transferring the part between a compression mold and an injection mold is obviated, thereby reducing the duration of the manufacturing process. In addition, employing a single mold reduces design and manufacturing costs, as compared to producing a first mold for the compression forming process and a second mold for the injection molding process.

FIG. 6 is a perspective view of an embodiment of a vehicle trim component 66 manufactured by concurrent compression forming and injection molding, showing the process of applying a cover stock 86. As illustrated, the cover stock 86 is applied to the fiber panel 44 (e.g., via an adhesive layer) to form a show surface 88. The cover stock 86 may be a woven or non-woven fabric, an appliqué, a vinyl layer, a foam layer, a foil layer, or a leather covering, for example. Such a cover stock 86 may establish a show surface 88 that matches the vehicle interior 12, thereby enhancing the appearance of the trim component 66. In the illustrated embodiment, the cover stock 86 is applied to the fiber panel 44 after the trim component 66 is formed. However, in certain embodiments, the cover stock may be applied during the compression molding process. For example, the cover stock may be positioned between the first surface 38 of the mold cavity 40 and the fiber panel 44 prior to compression forming. As the fiber panel 44 solidifies within the mold cavity 40, the cover stock may bind to the fiber panel, thereby establishing a desired show surface. As will be appreciated, the cover stock 86 may be applied to at least a portion of the fiber panel 44 and/or at least a portion of a resin component to provide the desired show surface 88.

FIG. 7 is a front view of an embodiment of a vehicle trim component manufactured by concurrent compression forming and injection molding, including a weakened zone configured to facilitate airbag deployment. In the illustrated embodiment, the trim component 66 includes a resin feature 90 formed within the gap 52 of the fiber panel 44. As illustrated, the resin feature 90 is substantially H-shaped, thereby establishing a long interface between the feature 90 and the fiber panel 44. The long interface provides a weakened zone, in which a sufficient force applied to the trim component 66 will induce separation of the resin feature 90 from the fiber panel 44. By way of example, the trim component 66 may be an interior door panel configured to conceal an airbag. Upon deployment, the airbag will apply a force to the trim component 66 sufficient to induce separation of the resin feature 90 from the fiber panel 44, thereby facilitating airbag deployment.

While the feature 90 is substantially H-shaped in the illustrated embodiment, it should be appreciated that alternative embodiments may include other weakened zone shapes (e.g., U-shaped, T-shaped, circular, square, etc.). In addition, certain trim components 66 may include a substantially continuous fiber panel 44 surrounded by a resin border 68, thereby forming a weakened zone about the periphery 50 of the fiber panel 44. Moreover, it should be appreciated that the trim component may include various reinforcing features (e.g., ribs 82, additional fiber panels, thicker resin regions, etc.) configured to particularly adjust the strength of the weakened zone such that the trim component remains substantially intact until the airbag is deployed. Furthermore, the weakened zone between the resin feature 90 and the fiber panel 44 may be further weakened by scoring (e.g., via in-mold scoring, laser scoring, etc.), thereby ensuring that the force of the airbag induces the resin feature 90 to separate from the fiber panel 44.

In certain embodiments, additional elements may be utilized to reinforce the weakened zone and/or to tether components during airbag deployment. For example, after the trim component 66 is formed, a flexible panel (e.g., carbon fiber, glass fiber, synthetic fiber, etc.) may be coupled to the fiber panel 44 and to the resin feature 90. In such embodiments, during airbag deployment, the flexible panel may tether the resin feature 90 to the fiber panel 44, thereby retaining the resin feature 90 as the resin feature 90 separates from the fiber panel 44 at the weakened zone. In further embodiments, the flexible panel may be coupled to the trim component 66 during the compression forming/injection molding process. For example, the flexible panel may be placed in the mold cavity adjacent to the fiber panel. As the fiber panel 44 solidifies within the mold cavity, the flexible panel will bond to the fiber panel. In addition, resin injected into the gap will bond to the flexible panel, thereby establishing a trim component configured to retain the resin feature 90 during airbag deployment.

FIG. 8 is a cross-sectional view of an embodiment of a vehicle trim component manufactured by concurrent compression forming and injection molding, including a reinforcement element 92 extending through the fiber panel 44. As illustrated, the fiber panel 44 includes a gap 52 that enables resin to flow through the fiber panel 44 during the injection molding process. Consequently, portions of the resin reinforcement element 92 are formed on each side of the fiber panel 44, thereby locking the element 92 to the panel 44. Due to the thickness of the reinforcement element 92, the resin component may provide additional structural rigidity to a region of the trim component that may experience high loading. By combining various resin and fiber elements, a trim component 66 having a desired shape and a desired strength may be formed.

In certain embodiments, the reinforcement element 92 is formed by compressing the fiber panel 44 between opposite surfaces of the mold cavity. Once the fiber panel solidifies, at least one of the surfaces is partially retracted, thereby establishing a void having the shape of the reinforcement element 92. Resin is then injected into the void to form the element 92. In alternative embodiments, the shape of the fiber panel 44 adjacent to the gap 52 is formed by the pressure of the injected resin. Such embodiments may obviate the step of retracting the mold surface after the compression molding process.

FIG. 9 is a cross-sectional view of an embodiment of a vehicle trim component manufactured by concurrent compression forming and injection molding, including a high curvature element 94 formed within a gap 52 in the fiber panel 44. By way of example, the mold cavity 40 may be contoured to form the fiber panel into a shape having a relatively low curvature, and to form the resin into a resin element 94 having a high curvature. Because the curvature of the fiber panel may be limited due to the rigidity of the fibers, forming the trim component 66 in this manner facilitates formation of high curvatures regions, while maintain a desired structural rigidity. As previously discussed, the gap 52 in the fiber panel 44 may be intentionally positioned within a high curvature region and/or unintentionally formed by fiber tearing within the high curvature region.

FIG. 10 is a cross-sectional view of an embodiment of a vehicle trim component manufactured by concurrent compression forming and injection molding, including a lap joint between a resin component and a fiber panel. As illustrated, a resin component 96 overlaps a portion of the fiber panel 44, thereby forming a lap joint 98. By increasing the contact area between the resin component 96 and the fiber panel 44, the structural integrity of the interface may be enhanced. As will be appreciated, the extend of the overlap may be particularly configured to establish the desired bonding strength between the resin component 96 and the fiber panel 44. It should also be appreciated, that in alternative embodiments, the fiber panel 44 may overlap a portion of the resin component 96.

Figure 11:
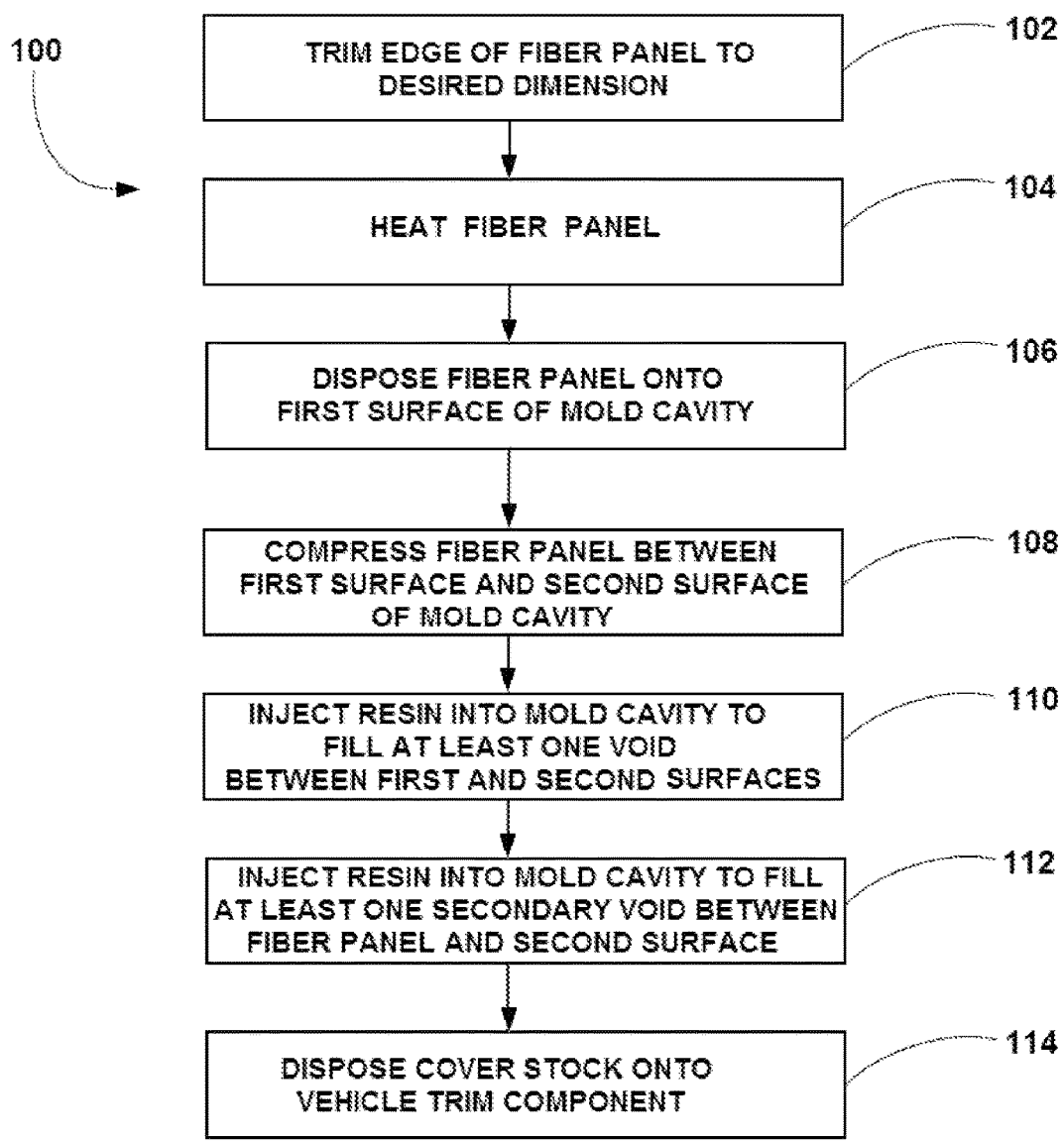
FIG. 11 is a flow diagram of an exemplary method of manufacturing a vehicle trim component via concurrent compression forming and injection molding.

FIG. 11 is a flow diagram of an exemplary method 100 of manufacturing a vehicle trim component via concurrent compression forming and injection molding. First, as represented by block 102, at least one edge of a fiber panel is trimmed to a desired dimension. As previously discussed, trimming the fiber panel prior to the compression forming process facilitates recycling of the offal, thereby reducing waste that may otherwise be deposited in a landfill. Once the fiber panel is trimmed, the panel is heated, as represented by block 104. For example, if the fiber panel includes thermoplastic resin, heating the panel will liquefy the resin, thereby facilitating compression forming of the panel. Alternatively, if the fiber panel includes a thermoset resin, the step of heating the fiber panel prior to placing the panel into the mold cavity may be obviated.

The fiber panel is then disposed onto a first surface of a mold cavity, as represented by block 106. Next, the fiber panel is compressed between the first surface and a second surface of the mold cavity to form the fiber panel into a desired shape, as represented by block 108. Resin is then injected into the mold cavity to fill at least one void between the first surface and the second surface adjacent to the fiber panel, as represented by block 110. For example, the resin may fill a void extending about a portion of the periphery of the fiber panel to form a border. The resin may also fill a void corresponding to a gap within the fiber panel, thereby providing a substantially continuous structure. In certain embodiments, the resin is injected into the mold cavity to fill at least one secondary void between the fiber panel and the second surface, as represented by block 112. For example, the secondary void may be shaped to form an ancillary component, such as a supporting rib or a connector. As will be appreciated, steps 110 and 112 may be performed at the same time by injecting resin into a port that is fluidly coupled to the primary and secondary voids. After the interior trim component is removed from the mold cavity, a cover stock may be disposed onto the vehicle trim component, as represented by block 114.

In certain embodiments, the fiber panel 44 and/or various resin components may be particularly configured to provide a desirable show surface for the trim component 66. In such embodiments, the cover stock 86 may be obviated, thereby reducing manufacturing costs. In addition, while a single fiber panel 44 is described above, it should be appreciated that the mold cavity may be configured to receive multiple fiber panels, and to compression mold the fiber panels into a desired trim component 66. Furthermore, in certain embodiments, multiple resins (e.g., shots of resin) may be injected into the mold cavity to form resin components having varying aesthetic and/or structural properties. For example, glass-filled resin may be injected into regions where additional structural support is desired, and pure resin may be injected into regions which form a portion of the show surface. In addition, harder and/or softer resins may be injected into various regions to provide the desired texture/structural properties.

In certain embodiments, resin may be injected through a first fluid pathway extending to the first surface of the mold cavity, and through a second fluid pathway extending to the second surface of the mold cavity. In such embodiments, a portion of each side of the fiber panel may be coated with a layer of resin. In alternative embodiments, resin may be injected through a fluid pathway extending through one surface of the mold cavity. The resin may then flow through a gap in the fiber panel, thereby enabling the resin to coat at least a portion of each side of the fiber panel. In further embodiments, the pressure of the injected resin may induce the formation of a gap that facilitates resin flow through the fiber panel 44.

Furthermore, certain components of an airbag assembly may be formed by the concurrent compression forming/injection molding process. For example, in certain embodiments, an airbag door may include a first half formed by a compression formed fiber panel, and a second half formed by an injection molded resin. The airbag door may be configured to separate along the interface between the fiber panel and the resin component. In further embodiments, the mold cavity may include a void configured to form an injection molded airbag chute adjacent to the airbag door. In addition, additional components, such as hinges, reinforcement elements and/or tethers, may be placed into the mold cavity prior to the compression forming/injection molding process. Such components may be integrated into the airbag door as the fiber panel is compressed and/or the resin is injection.

In certain embodiments, the trim component 66 may include structurally weakened and/or strengthened regions to provide a desired rigidity and/or to absorb energy associated with an impact. For example, the fiber panel 44 may include scores, seams and/or perforations to enable the fiber panel 44 to collapse during an impact, thereby absorbing a portion of the impact energy. In addition, resin ribs coupled to the fiber panel may be arranged (e.g., oriented perpendicular to a desired collapse direction) to facilitate a desired degree of energy absorption. In certain embodiments, the scores, seams and/or perforations may be filled with resin to provide a desirable show surface, while enabling the trim component to collapse during an impact.

Retractable Pin Assembly for Securing Fiber Panel to Mold

Certain mold assemblies include a first mold element configured to receive a fiber panel, and multiple pins configured to penetrate the fiber panel to secure the fiber panel to the first mold element. The pins hold the fiber panel in a desired position and/or orientation, thereby enabling a second mold element to compress the fiber panel against the first mold element to form a component of a desired shape. Unfortunately, the pins may leave irregular voids in the fiber panel, thereby establishing a component having an uneven texture. In addition, the second mold element may include recesses configured to accommodate the pins extending from the first mold element. Forming the recesses within the second mold element may increase the cost and complexity of the mold assembly.

Certain embodiments of the mold assembly described below include a retractable pin assembly configured to retract holding pins prior to or during compression of the fiber panel, thereby enabling resin to fill voids formed by the holding pins. As a result, the component may have a substantially smooth texture. For example, in certain embodiments, a mold assembly for manufacturing a vehicle trim component includes a first mold element configured to receive a fiber panel. The mold assembly also includes a retractable pin assembly having multiple holding pins configured to penetrate the fiber panel to secure the fiber panel to the first mold element. In addition, the mold assembly includes a second mold element configured to compress the fiber panel between a first surface of the first mold element and a second surface of the second mold element to form the fiber panel into a desired shape. The retractable pin assembly is configured to withdraw the holding pins from the fiber panel prior to or during compression of the fiber panel between the first and second surfaces. Furthermore, the mold assembly may include fluid pathways configured to inject resin into voids in the fiber panel formed by the holding pins. Consequently, a substantially smooth component may be formed when the resin cures and hardens.

Figure 12:
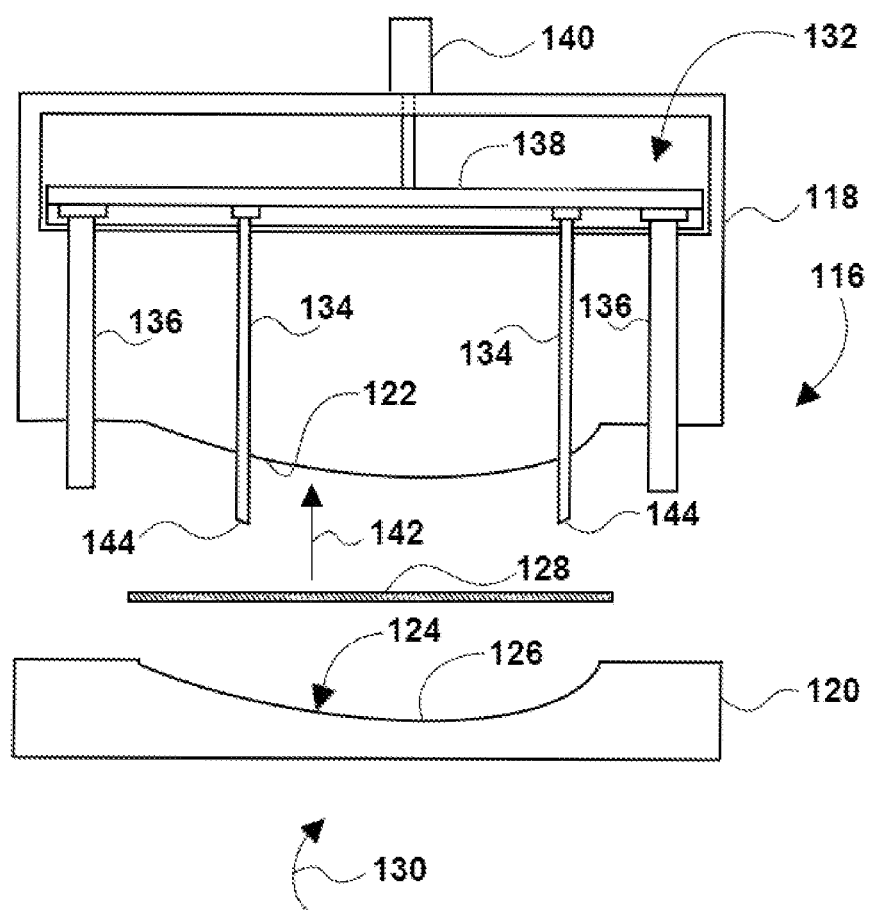
FIG. 12 is a schematic diagram of an embodiment of a mold assembly having a retractable pin assembly configured to secure a fiber panel within a mold cavity.

FIG. 12 is a schematic diagram of an embodiment of a mold assembly 116 having a retractable pin assembly configured to secure a fiber panel within a mold cavity. In the illustrated embodiment, the mold assembly 116 includes a first (e.g., upper) mold element 118 and a second (e.g., lower) mold element 120. As illustrated, the first mold element 118 includes a first surface 122 defining a first portion of a mold cavity 124, and the second mold element 120 includes a second surface 126 defining a second portion of the mold cavity 124. The first surface 122 is configured to receive a fiber panel 128, and the second surface 126 is configured to compress the fiber panel 128 against the first surface 122 to form the fiber panel 128 into a desired shape.

In certain embodiments, the fiber panel 128 includes a combination of structural fibers and thermoplastic resin. The structural fibers may include natural fibers, such as hemp, wood, flax, kenaf and sisal, and/or synthetic fibers, such as glass fibers, carbon fibers and polymeric fibers. In addition, the thermoplastic resin may include polypropylene (PP), acrylonitrile butadiene styrene (ABS) and/or polycarbonate (PC) binders, for example. By way of example, the fiber panel 128 may be constructed from about 50 percent natural fibers and about 50 percent PP. To facilitate compression forming, the fiber panel 128 is heated (e.g., to about 200 degrees Celsius) to induce the thermoplastic resin to liquefy. The fiber panel 128 is then disposed onto the first surface 122 of the cavity 124, and compressed between the first surface 122 and the second surface 126 as the second mold element 120 is driven toward the first mold element 118 along the direction 130. As the fiber panel 128 cools within the mold assembly 116, the thermoplastic solidifies, thereby establishing a substantially rigid composite panel that conforms to the shape of the mold cavity 124.

In further embodiments, the fiber panel 128 includes a combination of structural fibers and a thermoset resin. Similar to the embodiment described above, the structural fibers may include natural fibers, such as hemp, wood, flax, kenaf and sisal, and/or synthetic fibers, such as glass fibers, carbon fibers and polymeric fibers. In addition, the thermoset resin may include epoxy resin, polyimide resin, polyester resin and/or vinylester resin, for example. By way of example, the fiber panel 128 may be constructed from Fibrowood, which is manufactured by Johnson Controls Technology Company of Holland, Mich. To facilitate compression forming, the fiber panel 128 is disposed onto the first surface 122 of the cavity 124, and compressed between the first surface 122 and the second surface 126 as the second mold element 120 is driven toward the first mold element 118 along the direction 130. During the compression process, the panel 128 is heated (e.g., via a heated mold assembly 116), thereby inducing the thermoset resin to cure. Consequently, a substantially rigid composite panel that conforms to the shape of the mold cavity 124 is formed.

In the illustrated embodiment, the mold assembly 116 includes a retractable pin assembly 132 configured to hold the fiber panel 128 in a desired position until the second mold element 120 is proximate to the first mold element 118. As illustrated, the retractable pin assembly 132 includes multiple holding pins 134 configured to penetrate the fiber panel 128 to secure the fiber panel 128 to the first mold element 118. While the illustrated embodiment includes two holding pins 134, it should be appreciated that alternative embodiments may include more or fewer holding pins 134. For example, certain embodiments may include 1, 2, 3, 4, 6, 8, 10, 12, or more holding pins 134.

The retractable pin assembly 132 is configured to withdraw the holding pins from the fiber panel 128 prior to or during compression of the fiber panel between the first surface 122 and the second surface 126. For example, the retractable pin assembly 132 may retract the holding pins 134 when the first and second surfaces are sufficiently close to substantially block movement of the fiber panel 128 within the mold cavity 124. Because the holding pins 134 are withdrawn from the fiber panel 128 prior to or during the compression forming process, resin may be injected into voids formed by the holding pins 134, thereby establishing a vehicle trim component having a substantially smooth surface. In addition, because the holding pins 134 retract instead of entering openings within the second mold element 120, the cost and/or complexity of the second mold element may be reduced.

In the illustrated embodiment, the retractable pin assembly 132 includes return pins 136 configured to drive the holding pins 134 to withdraw from the fiber panel 128. As discussed in detail below, contact between the return pins 136 and a surface of the second mold element 120 drives a connecting plate 138 away from the first surface 122. The connecting plate 138, in turn, drives the holding pins 134 to retract. The holding pins 134 and the return pins 136 are coupled to the connecting plate 138 by a suitable connection, such as a welded connection, a mechanical interlock, or a fastener, for example. While the illustrated embodiment includes two return pins 136, it should be appreciated that alternative embodiments may include more or fewer return pins 136. For example, certain embodiments may include 1, 2, 3, 4, 6, 8, 10, 12, or more return pins.

The retractable pin assembly 132 also includes an actuator 140 configured to extend the holding pins 134 after the mold elements are separated from one another and the fiber panel is removed from the mold cavity. For example, the actuator 140 may include a pneumatic cylinder configured to drive the connecting plate 138 to an initial position that enables the holding pins 134 to penetrate a subsequent fiber panel 128. However, it should be appreciated that the actuator 140 may include a hydraulic cylinder, an electromechanical drive unit, or a mechanical actuator in alternative embodiments.

To secure the fiber panel 128 to the first mold element 118, the fiber panel 128 is moved in the direction 142 such that a pointed end 144 of each holding pin 134 penetrates the fiber panel 128. For example, an operator may position the fiber panel 128 at a desired position/orientation within the mold cavity 124, and then move the fiber panel 128 in the direction 142 such that the holding pins 134 penetrate the fiber panel. Contact between the holding pins 134 and the fiber panel 128 secures the fiber panel 128 in the desired position/orientation.

Figure 13:
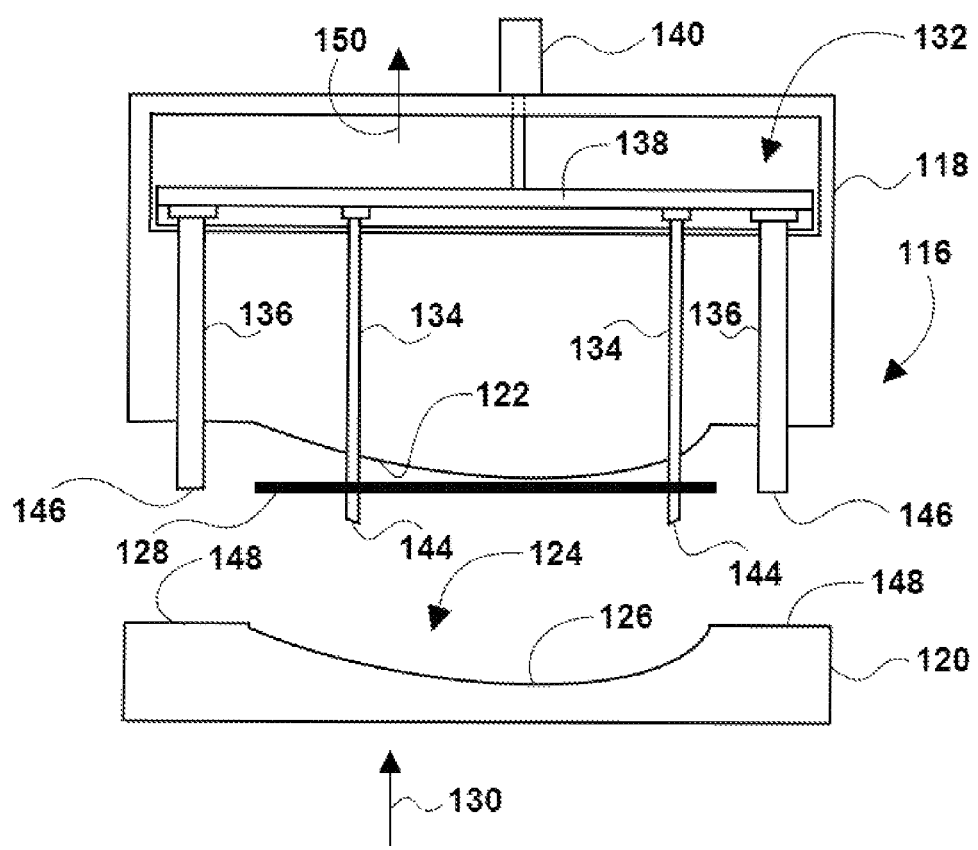
FIG. 13 is a schematic diagram of the mold assembly of FIG. 12, in which the fiber panel is secured to a mold element of the mold assembly via holding pins.

FIG. 13 is a schematic diagram of the mold assembly 116 of FIG. 12, in which the fiber panel 128 is secured to the first mold element 118 via the holding pins 134. As previously discussed, the holding pins 134 are configured to secure the fiber panel 128 in a desired position/orientation until the first and second surfaces are sufficiently close to substantially block movement of the fiber panel 128 within the mold cavity 124. Once the fiber panel 128 is secured to the first mold element 118, the second mold element 120 is driven in the direction 130. When the second mold element 120 is proximate to the first mold element 118, a distal end 146 of each return pin 136 contacts a bearing surface 148 of the second mold element 120. As the second mold element 120 continues to move in the direction 130, contact between the bearing surface 148 and the distal end 146 of each return pin 136 drives the connecting plate 138 in the direction 150. Accordingly, the holding pins 134 are driven in the direction 150, thereby withdrawing the holding pins 134 from the fiber panel 128. Because the holding pins 134 are withdrawn while the mold elements are proximate to one another, movement of the fiber panel 128 is substantially blocked by the first surface 122 and the second surface 126.

As will be appreciated, the length of the holding pins 134 and/or the return pins 136 may be adjusted to control withdrawal of the holding pins 134 from the fiber panel 128.

For example, longer holding pins 134 may secure the fiber panel 128 to the first mold element 118 until the mold elements are closer to one another. Conversely, shorter holding pins 134 may release the fiber panel 128 from the first mold element 118 while the mold elements are farther apart. Similarly, longer return pins 136 may induce the holding pins 134 to withdraw from the fiber panel 128 while the mold elements are farther apart, and shorter return pins 136 may induce the holding pins 134 to secure the fiber panel 128 to the first mold element 118 until the mold elements are closer to one another. As will be appreciated, controlling the withdrawal of the holding pins 134 may facilitate accurate placement of the fiber panel within the mold cavity, and may control tension within the fiber panel prior to or during the compression forming process.

Figure 14:
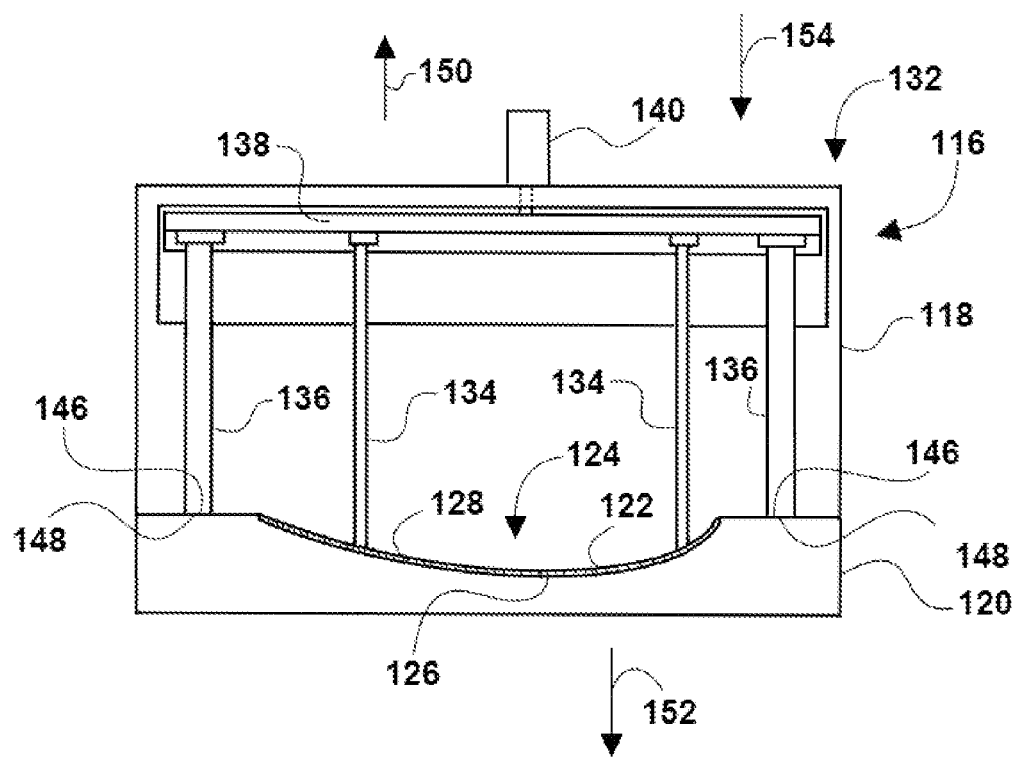
FIG. 14 is a schematic diagram of the mold assembly of FIG. 12, in which the holding pins are retracted.

FIG. 14 is a schematic diagram of the mold assembly of FIG. 12, in which the holding pins 134 are retracted. As previously discussed, contact between the distal end 146 of each return pin 136 and the bearing surface 148 of the second mold element drives the return pins 136 in the direction 150. Accordingly, the connecting plate 138, which is coupled to the return pins 136, drives the holding pins 134 in the direction 150, thereby withdrawing the holding pins 134 from the fiber panel. As illustrated, the holding pins 134 are withdrawn from the fiber panel 128, and the fiber panel 128 is compressed between the first surface 122 of the first mold element 118 and the second surface 126 of the second mold element 120.

After the fiber panel is compression-formed into the desired shape, the second mold element 120 is driven in a direction 152 away from the first mold element 118. The fiber panel 128 is then removed from the mold cavity 124 (e.g., via an ejection system). Next, the actuator 140 drives the connecting plate 138 in the direction 154, thereby transitioning the holding pins 134 and the return pins 136 to an extended position. With the holding pins 134 in the extended position, a subsequent fiber panel 128 may be secured to the first mold element 118 via penetration of the holding pins 134 into the fiber panel 128.

While the embodiment described above employs an actuator to extend the holding pins 134 after the fiber panel 128 is removed from the mold cavity 124, it should be appreciated that other actuating assemblies may be employed in alternative embodiments. For example, a mechanical linkage between the second mold element and the holding pins may drive the holding pins to extend as the second mold element moves away from the first mold element. In further embodiments, a spring may urge the holding pins to extend upon movement of the second mold element away from the first mold element. Alternatively, the distal end of each return pin may be magnetically coupled to the bearing surface of the second mold element. In such a configuration, movement of the second mold element away from the first mold element drives the return pins and the holding pins to the extended position. However, further movement of the second mold element away from the first mold element overcomes the magnetic coupling between the return pins and the second mold element, thereby enabling the second mold element to continue movement away from the first mold element. In further embodiments, the mold assembly may include ejector pins to facilitate extraction of the fiber panel from the mold cavity. In such embodiments, movement of the ejector pins may drive the connecting plate in the direction 154, thereby transitioning the holding pins 134 to the extended position.

In addition, while the embodiment described above employs return pins 136 and a connecting plate 138 to drive the holding pins 134 to retract, it should be appreciated that other actuating assemblies may be employed in alternative embodiments. For example, in certain embodiments, an actuator (e.g., hydraulic cylinder, pneumatic cylinder, electromechanical actuator, etc.) may be utilized to transition the holding pins between the extended and retracted positions. In such embodiments, a sensor may be employed to determine a position of the second mold element relative to the first mold element. A controller communicatively coupled to the senor may then control the position of the holding pins based on the detected position of the second mold element. For example, the controller may instruct the holding pins to retract when the second mold element is proximate to the first mold element. The controller may also instruct the holding pins to extend as the second mold element moves away from the first mold element.

FIG. 15 is a schematic diagram of an embodiment of a mold assembly 116 having a fluid pathway configured to inject resin into a void formed by a holding pin. As previously discussed, the fiber panel 128 is secured to the first mold element 118 by moving the fiber panel 128 in the direction 142 such that the pointed end 144 of the holding pin 134 penetrates the fiber panel 128. The second mold element 120 is then driven in the direction 130, thereby inducing the retractable pin assembly 132 to withdraw the holding pin 134 from the fiber panel 128. However, the holding pin 134 may establish a void in the fiber panel 128. Accordingly, the mold assembly 116 is configured to flow resin into the void, thereby enhancing the smoothness of the vehicle trim component.

In the illustrated embodiment, the first mold element 118 includes a resin manifold 156 and a fluid pathway 158 extending from the resin manifold 156 to the retractable pin 134. As discussed in detail below, the resin manifold 156 and the fluid pathway 158 are configured to provide resin to the void formed by the holding pin 134. As a result, the void may be filled with resin, thereby establishing a vehicle trim component having a substantially smooth texture.

FIG. 16 is a schematic diagram of the mold assembly 116 of FIG. 15, in which the fiber panel 128 is secured to the first mold element 118 via a holding pin 134. As illustrated, the holding pin 134 displaces material as the holding pin 134 penetrates the fiber panel 128. As a result, a void is formed within the fiber panel 128. As discussed in detail below, the void may be filled with resin to establish a vehicle trim component having a substantially smooth texture.

FIG. 17 is a schematic diagram of the mold assembly 116 of FIG. 15, in which the holding pin 134 is retracted. As illustrated, withdrawing the holding pin 134 from the fiber panel 128 forms a void 160. However, the fluid pathway 158 is positioned to flow resin from the resin manifold 156 into the void 160. Accordingly, resin may be injected through the manifold 156 and the fluid pathway 158 to substantially fill the void 160, thereby enhancing the smoothness of the vehicle trim component.

FIG. 18 is a schematic diagram of the mold assembly 116 of FIG. 15, in which resin is injected into the void 160 formed by the holding pin 134. As illustrated, the resin substantially fills the void 160, thereby forming a resin feature 162 that establishes a vehicle trim component having a substantially smooth texture. In addition, the resin substantially fills the fluid pathway 158, thereby establishing a runner or ridge 164 on the rear surface of the vehicle trim component. As will be appreciated, each void within the fiber panel may be filled in a similar manner. Because the voids formed by the holding pins are filled with resin, the holding pins may be positioned to provide enhanced coupling between the fiber panel and the first mold element without degrading the smoothness of the vehicle trim component.

FIG. 19 is a top view of an embodiment of a vehicle trim component 166 formed within a mold cavity having a retractable pin assembly. As illustrated, each void within the fiber panel 128 is filled with a resin feature 162, thereby establishing a vehicle trim component 166 having a substantially smooth surface. For example, a coverstock may be disposed on a surface of the fiber panel to form a desirable show surface. Because the voids in the fiber panel are filled with resin, the coverstock may appear substantially smooth, thereby enhancing the visual appeal of the vehicle interior.

Figure 20:
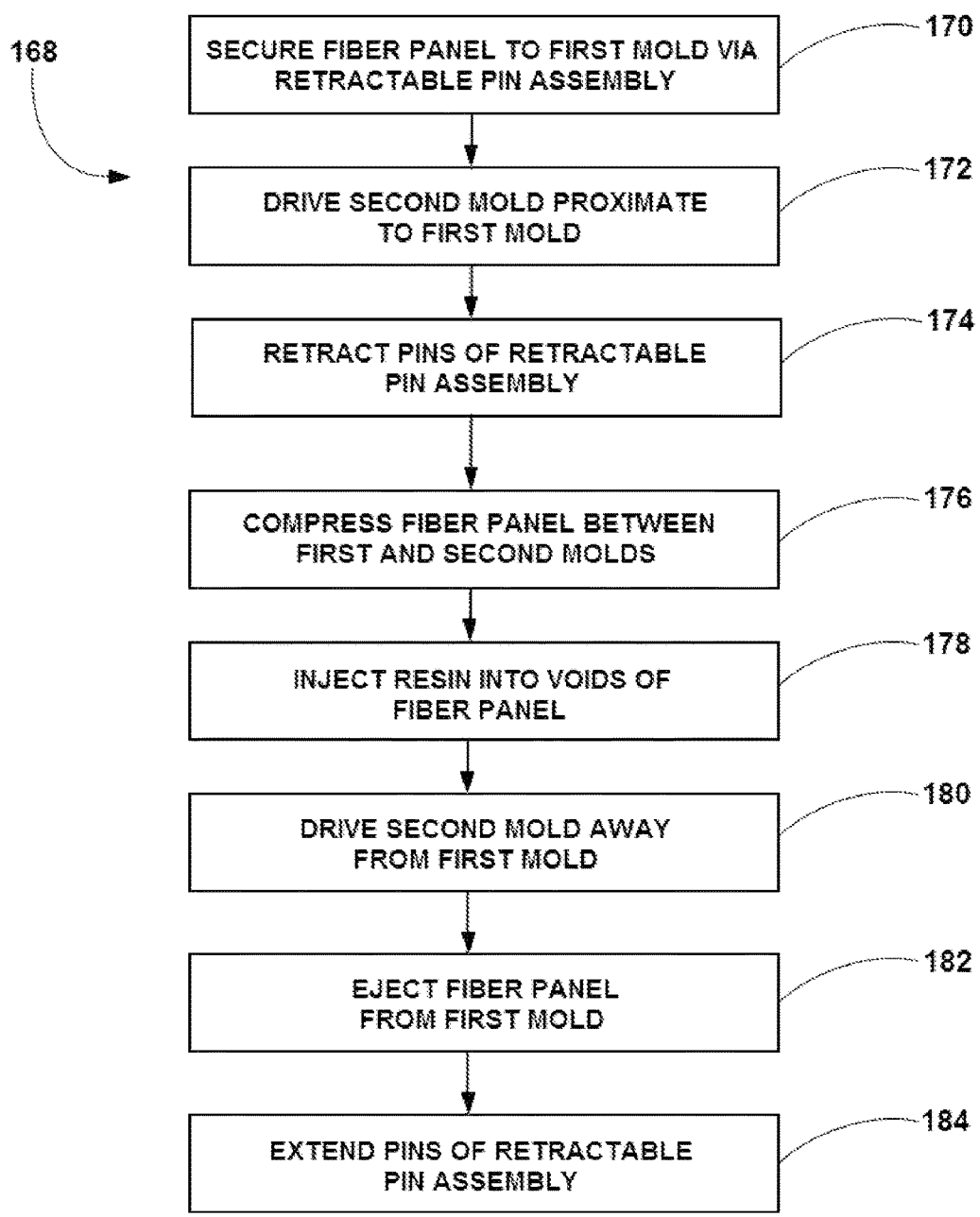
FIG. 20 is a flow diagram of an embodiment of a method for forming a vehicle trim component within a mold assembly having a retractable pin assembly.

FIG. 20 is a flow diagram of an embodiment of a method 168 for forming a vehicle trim component within a mold assembly having a retractable pin assembly. First, as represented by block 170, a fiber panel is secured to a first mold element via a retractable pin assembly. As previously discussed, the retractable pin assembly includes multiple holding pins configured to penetrate the fiber panel to secure the fiber panel to the first mold element. Next, as represented by block 172, the second mold element is driven toward the first mold element. When the second mold element is proximate to the first mold element, the holding pins of the retractable pin assembly are retracted, as represented by block 174. For example, the retractable pin assembly may include multiple return pins configured to drive the holding pins to withdraw from the fiber panel via contact between the return pins and the second mold element.

The fiber panel is then compressed between the first mold element and the second mold element, as represented by block 176. As previously discussed, compressing the fiber panel between the mold elements forms the fiber panel into a desired shape. In certain embodiments, the holding pins are retracted (e.g., withdrawn from the fiber panel) as the fiber panel is compressed between the first mold element and the second mold element. Resin is then injected into voids in the fiber panel formed by the holding pins, as represented by block 178. Filling the voids may establish a vehicle interior component having a substantially smooth surface, thereby enhancing the appearance of the vehicle interior.

After the compression forming/injection molding process is complete, the second mold element is driven away from the first mold element, as represented by block 180. The fiber panel is then ejected from the first mold element (e.g., via ejection pins), as represented by block 182. Next, as represented by block 184, the holding pins of the retractable pin assembly are extended. For example, the retractable pin assembly may include an actuator configured to drive the holding pins toward an extended position, thereby enabling the holding pins to penetrate a subsequent fiber panel.

Resin Feature for Supporting a Bent Edge of a Fiber Panel

Certain mold assemblies include a first mold element and a second mold element configured to be brought together to compress a fiber panel into a desired shape. Such mold assemblies may also include a trim blade configured to penetrate the fiber panel as the first and second mold elements are brought together to trim the fiber panel to desired dimensions. Unfortunately, using an in-mold trim blade to shape the fiber panel may weaken the edges of the panel, thereby reducing longevity.

Certain embodiments of the mold assembly described below are configured to inject resin onto adjacent inner surfaces of a bent edge of the fiber panel, thereby enhancing the strength of the edge. For example, in certain embodiments, a mold assembly for manufacturing a vehicle trim component includes a first mold element configured to receive a fiber panel. The mold assembly also includes a second mold element configured to compress the fiber panel between a first surface of the first mold element and a second surface of the second mold element to form the fiber panel into a desired shape. The mold assembly also includes a fluid pathway configured to inject resin onto adjacent inner surfaces of a bent edge of the fiber panel such that the resin extends to a distal end of the bent edge. Injecting the resin onto the inner surfaces of the bent edge establishes a resin feature that supports the bent edge, thereby enhancing the strength and increasing the longevity of the fiber panel.

Figure 21:
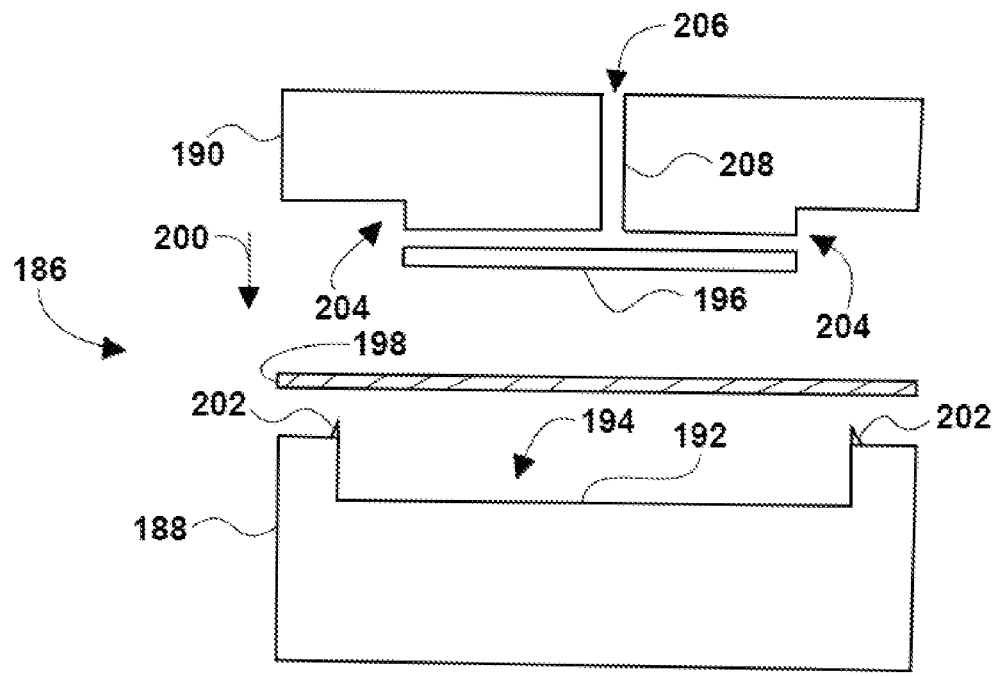
FIG. 21 is a schematic diagram of an embodiment of a mold assembly having a fluid pathway configured to inject resin onto adjacent inner surfaces of a bent edge of a fiber panel.

FIG. 21 is a schematic diagram of an embodiment of a mold assembly 186 having a fluid pathway configured to inject resin onto adjacent inner surfaces of a bent edge of a fiber panel. In the illustrated embodiment, the mold assembly 186 includes a first (e.g., lower) mold element 188 and a second (e.g., upper) mold element 190. As illustrated, the first mold element 188 includes a first surface 192 defining a first portion of a mold cavity 194, and the second mold element 190 includes a second surface 196 defining a second portion of the mold cavity 194. The first surface 192 is configured to receive a fiber panel 198, and the second surface 196 is configured to compress the fiber panel 198 against the first surface 192 to form the fiber panel 198 into a desired shape.

In certain embodiments, the fiber panel 198 includes a combination of structural fibers and thermoplastic resin. The structural fibers may include natural fibers, such as hemp, wood, flax, kenaf and sisal, and/or synthetic fibers, such as glass fibers, carbon fibers and polymeric fibers. In addition, the thermoplastic resin may include polypropylene (PP), acrylonitrile butadiene styrene (ABS) and/or polycarbonate (PC) binders, for example. By way of example, the fiber panel 198 may be constructed from about 50 percent natural fibers and about 50 percent PP. To facilitate compression forming, the fiber panel 198 is heated (e.g., to about 200 degrees Celsius) to induce the thermoplastic resin to liquefy. The fiber panel 198 is then disposed onto the first surface 192 of the cavity 194, and compressed between the first surface 192 and the second surface 196 as the second mold element 190 is driven toward the first mold element 188 along the direction 200. As the fiber panel 198 cools within the mold assembly 186, the thermoplastic solidifies, thereby establishing a substantially rigid composite panel that conforms to the shape of the mold cavity 194.

In further embodiments, the fiber panel 198 includes a combination of structural fibers and a thermoset resin. Similar to the embodiment described above, the structural fibers may include natural fibers, such as hemp, wood, flax, kenaf and sisal, and/or synthetic fibers, such as glass fibers, carbon fibers and polymeric fibers. In addition, the thermoset resin may include epoxy resin, polyimide resin, polyester resin and/or vinylester resin, for example. By way of example, the fiber panel 198 may be constructed from Fibrowood, which is manufactured by Johnson Controls Technology Company of Holland, Mich. To facilitate compression forming, the fiber panel 198 is disposed onto the first surface 192 of the cavity 194, and compressed between the first surface 192 and the second surface 196 as the second mold element 190 is driven toward the first mold element 188 along the direction 200. During the compression process, the panel 198 is heated (e.g., via a heated mold assembly 186), thereby inducing the thermoset resin to cure. Consequently, a substantially rigid composite panel that conforms to the shape of the mold cavity 194 is formed.

In the illustrated embodiment, the first mold element 188 includes trim blades 202 configured to trim the fiber panel 198 to desired dimensions as the fiber panel 198 is compressed within the mold cavity 194. As the second mold element 190 is driven in the direction 200, contact between the second mold element 190 and the fiber panel 198 drives edges of the fiber panel 198 into contact with the trim blades 202. Further movement of the second mold element 190 in the direction 200 induces the trim blades 202 to penetrate the fiber panel 198, thereby trimming the fiber panel 198 to the desired dimensions. While two trim blades 202 are employed in the illustrated embodiment, it should be appreciated that alternative embodiments may include more or fewer trim blades 202 (e.g., 1, 2, 3, 4, 5, 6, or more). Furthermore, while the trim blades 202 are coupled to the first mold element 188 in the illustrated embodiment, it should be appreciated that at least a portion of the trim blades 202 may be coupled to the second mold element 190 in alternative embodiments.

The process of trimming the fiber panel 198 with the trim blades 202 may weaken the edges of the fiber panel 198. Accordingly, the illustrated mold assembly 186 is configured to inject resin onto adjacent inner surfaces of a bent edge of the fiber panel 198, thereby enhancing the strength of the edge. As illustrated, the second mold element 190 includes a recess 204 configured to establish a void within the mold cavity 194 when the mold assembly 186 is closed. As discussed in detail below, when the mold assembly 186 is closed, the void is positioned proximate to adjacent inner surfaces of a bent edge of the fiber panel 198. In the illustrated embodiment, the second mold element includes an inlet 206 and a fluid pathway 208 extending from the inlet 206 to the void. The fluid pathway 208 is configured to inject the resin into the void such that the resin flows onto adjacent inner surfaces of a bent edge of the fiber panel.

Figure 22:
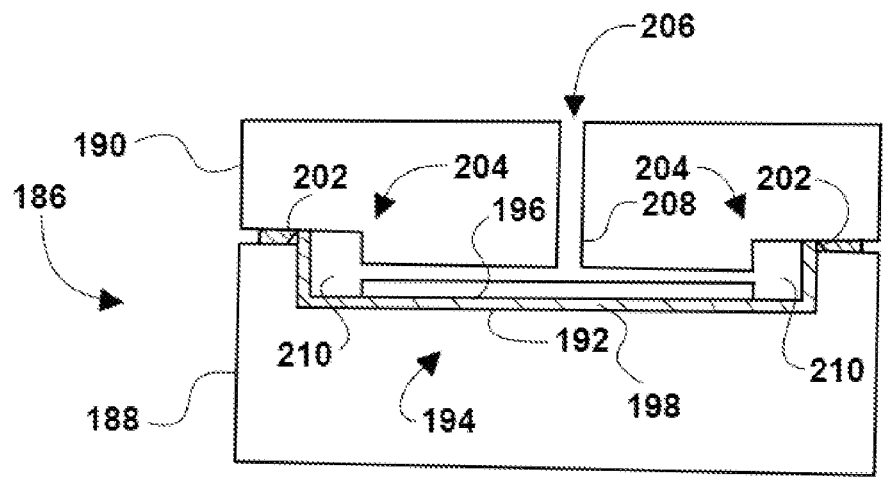
FIG. 22 is a schematic diagram of the mold assembly of FIG. 21 in a closed position.

FIG. 22 is a schematic diagram of the mold assembly 186 of FIG. 21 in a closed position. With the mold assembly in the closed position, the trim blade 202 penetrates the fiber panel 198, thereby trimming the fiber panel to the desired dimensions. In addition, the recess 204 establishes a void 210 positioned proximate to adjacent inner surfaces of a bent edge of the fiber panel 198. When resin is injected into the void 210 (e.g., via the inlet 206 and the fluid pathway 208), the resin flows onto the adjacent inner surfaces of the bent edge. Because the void extends to a distal end of the bent edge, the resin flows to the lateral extent of the fiber panel 198 (e.g., where the trim blade 202 cuts the fiber panel 198). Once the resin cures and hardens, a resin feature is formed that supports the bent edge of the fiber panel, thereby enhancing the strength and increasing the longevity of the vehicle trim component. In certain embodiments, the void 210 may extend about the entire periphery of the fiber panel 198. However, in alternative embodiments, the void 210 may extend about a portion of the periphery.

Figure 23:
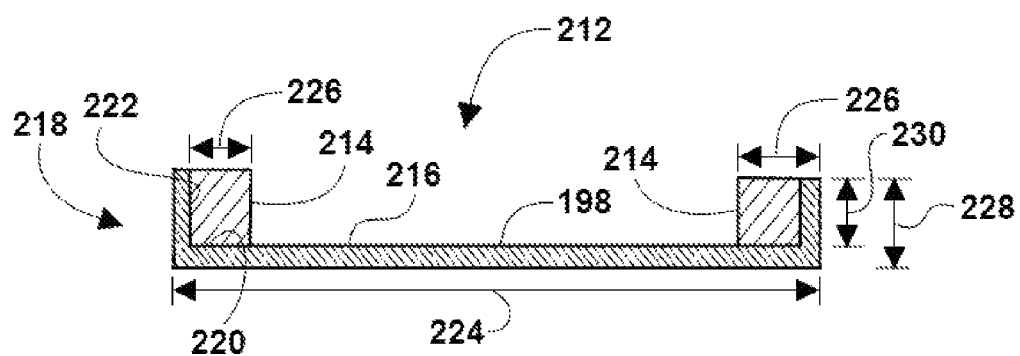
FIG. 23 is a cross-sectional view of an embodiment of a vehicle trim component having a resin feature configured to support a bent edge of a fiber panel.

FIG. 23 is a cross-sectional view of an embodiment of a vehicle trim component 212 having a resin feature 214 configured to support a bent edge of the fiber panel 198. As illustrated, the resin feature 214 is injection-molded (e.g., via the mold assembly 186 having the void 210) onto an inner surface 216 of the fiber panel 198. When the trim component 212 is installed within a vehicle, the inner surface 216 faces away from the vehicle interior. In this configuration, the resin feature 214 supports the bent edge 218 of the fiber panel 198 while providing a substantially smooth show surface (e.g., the surface opposite the inner surface 216).

In the illustrated embodiment, the resin feature 214 extends between a first inner surface 220 of the bent edge 218 and a second inner surface 222 of the bent edge 218. In addition, the resin feature 214 extends to a distal end of the bent edge 218. Accordingly, the resin feature 214 supports the bent edge 218, thereby enhancing the strength of the fiber panel 198, and increasing the longevity of the vehicle trim component 212. As will be appreciated, a length 224 of the fiber panel 198 may be selected based on a desired application. In addition, a length 226 of the resin feature 214 may be particularly selected to provide desired support to the bent edge 218 of the fiber panel 198. For example, if the vehicle trim component 212 is employed within a door panel, the resin feature 214 may have a longer length 226 to accommodate expected loads (e.g., from an occupant pulling on the bent edge 218 to close a vehicle door, from service personnel prying the bent edge 218 away from the door to remove the door panel, etc.). Furthermore, a height 228 of the bent edge 218 and a height 230 of the resin feature 214 may be particularly selected to provide desired support to the bent edge 218. For example, longer heights 228 and 230 may enhance the strength of the edge, thereby enabling the vehicle trim component 212 to accommodate higher loads.

In certain embodiments, the resin feature 214 may extend about the entire periphery of the vehicle trim component 212. However, alternative embodiments may include a resin feature 214 that extends about a portion of the periphery. In addition, while an angle between the inner surfaces 220 and 222 of the bent edge 218 is about 90 degrees in the illustrated embodiment, it should be appreciated that alternative embodiments may include a larger or smaller angle between the inner surfaces. In further embodiments, the bent edge may be curved, or may include multiple angled sections.

Figure 24:
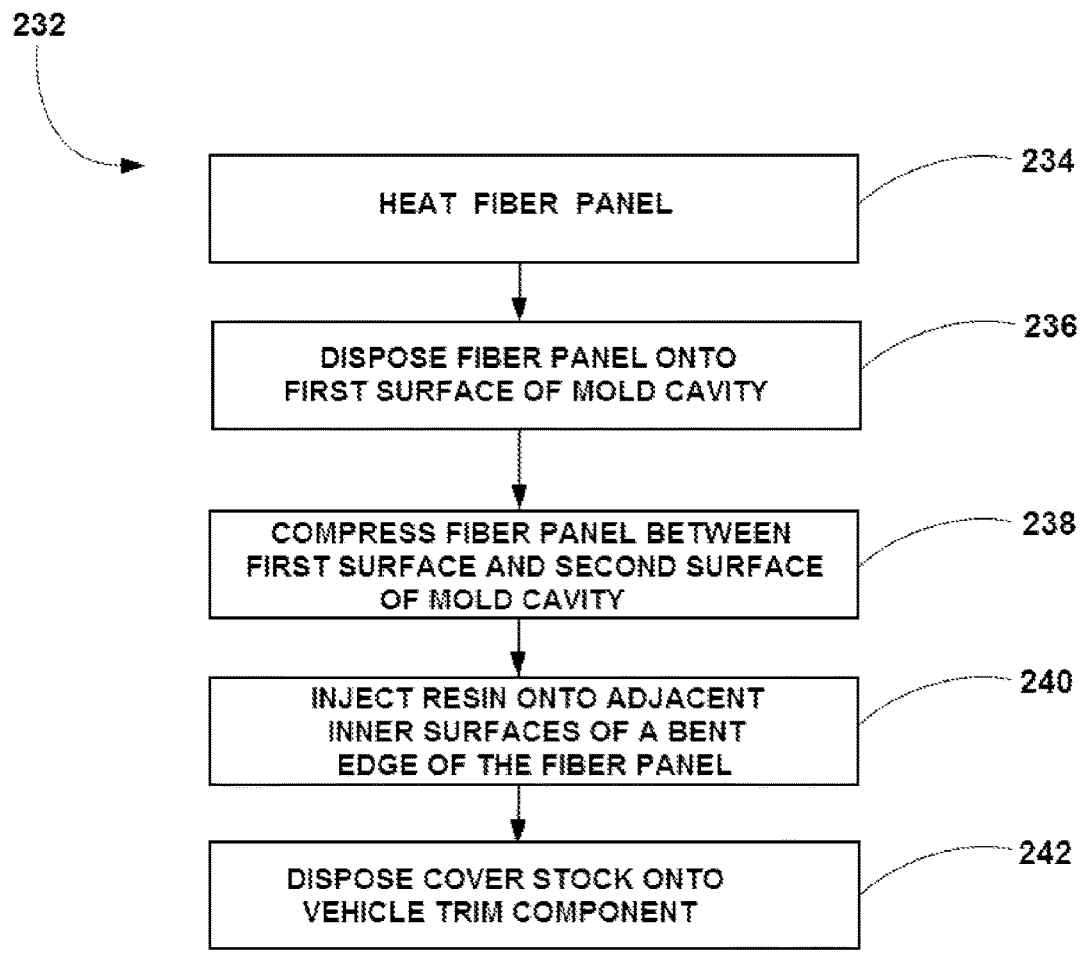
FIG. 24 is a flow diagram of an embodiment of a method for forming a vehicle trim component by injecting resin onto adjacent inner surfaces of a bent edge of a fiber panel.

FIG. 24 is a flow diagram of an embodiment of a method 232 for forming a vehicle trim component by injecting resin onto adjacent inner surfaces of a bent edge of a fiber panel. First, the fiber panel is heated, as represented by block 234. For example, if the fiber panel includes thermoplastic resin, heating the panel liquefies the resin, thereby facilitating compression forming of the panel. Alternatively, if the fiber panel includes a thermoset resin, the panel may be heated during the compression process. The fiber panel is then disposed onto a first surface of a mold cavity, as represented by block 236. Next, the fiber panel is compressed between the first surface and a second surface of the mold cavity to form the fiber panel into a desired shape, as represented by block 238.

Resin is then injected onto adjacent inner surfaces of a bent edge of the fiber panel, as represented by block 240. For example, the resin may be injected into a void positioned proximate to the adjacent inner surfaces of the bent edge. In such a configuration, the void establishes a resin feature that supports the bent edge of the fiber panel, thereby increasing the strength of the panel. After the interior trim component is removed from the mold cavity, a cover stock may be disposed onto the vehicle trim component, as represented by block 242. In certain embodiments, the fiber panel and/or various resin components may be particularly configured to provide a desirable show surface for the trim component. In such embodiments, the cover stock may be obviated, thereby reducing manufacturing costs.

Floating Core Assembly for Urging a Fiber Panel Against a Mold Surface

Certain mold assemblies include a first mold element and a second mold element configured to be brought together to compress a fiber panel into a desired shape. For example, the second mold element may drive the fiber panel into contact with the first mold element. Further movement of the second mold element relative to the first mold element compresses the fiber panel into the desired shape. In addition, a trim blade may be coupled to the first mold element, and configured to trim the fiber panel to desired dimensions as the first and second mold elements compress the fiber panel. Unfortunately, as the second mold element drives the fiber panel into contact with the first mold element, the fiber panel may become caught on the trim blade. As a result, the trim blade may tear a portion of the fiber panel, thereby weakening the fiber panel, and/or forming a vehicle trim component having an undesirable appearance/texture. In addition, while the fiber panel is caught on the trim blade, tension may build within the fiber panel as the second mold element continues to move toward the first mold element. Once the fiber panel is freed from the trim blade, the released tension may drive the fiber panel to shift within the mold assembly, thereby shifting the fiber panel away from the desired position/orientation.

Certain embodiments of the mold assembly described below include a floating core assembly configured to urge the fiber panel against a surface of a mold element before a trim blade penetrates the fiber panel. For example, in certain embodiments, a mold assembly for manufacturing a vehicle trim component includes a first mold element and a second mold element configured to be brought together to compress a fiber panel into a desired shape. The mold assembly also includes a trim blade configured to penetrate the fiber panel as the first and second mold elements are brought together to trim the fiber panel to desired dimensions. The mold assembly also includes a floating core assembly coupled to the second mold element, and configured to urge the fiber panel against a surface of the first mold element before the trim blade penetrates the fiber panel. Because the fiber panel is disposed against the surface of the first mold element before the trim blade penetrates the fiber panel, the possibility of the fiber panel being caught on the trim blade is substantially reduced or eliminated. Accordingly, the mold assembly may form a stronger and/or more aesthetically pleasing trim component.

Figure 25:
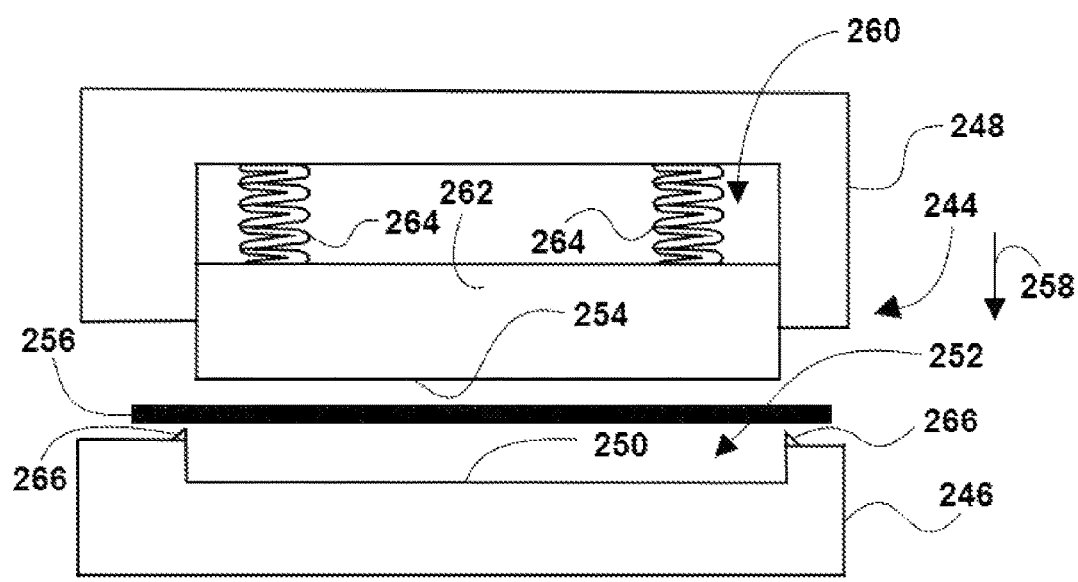
FIG. 25 is a schematic diagram of an embodiment of a mold assembly having a floating core assembly configured to urge a fiber panel against a surface of a mold element.

FIG. 25 is a schematic diagram of an embodiment of a mold assembly 244 having a floating core assembly configured to urge a fiber panel against a surface of a mold element. In the illustrated embodiment, the mold assembly 244 includes a first (e.g., lower) mold element 246 and a second (e.g., upper) mold element 248. As illustrated, the first mold element 246 includes a first surface 250 defining a first portion of a mold cavity 252, and the second mold element 248 includes a second surface 254 defining a second portion of the mold cavity 252. The first surface 250 is configured to receive a fiber panel 256, and the second surface 254 is configured to compress the fiber panel 256 against the first surface 250 to form the fiber panel 256 into a desired shape.

In the illustrated embodiment, the second mold element 248 includes a floating core assembly 260 having a core 262 and biasing members 264 (e.g., springs). As illustrated, the second surface 254 of the second mold element 248 is formed by the core 262 of the floating core assembly 260. Prior to compressing the fiber panel 256 within the mold cavity 252, the core 262 urges the fiber panel against the first surface 250 of the first mold element 246 as the second mold element 248 moves in the direction 258. Once the second surface 254 is in contact with the fiber panel 256, and the fiber panel 256 is in contact with the first surface 250, further movement of the second mold element 248 in the direction 258 induces the core to transition from the illustrated extended position to a retracted position. With the core 262 in the retracted position, the biasing members 264 provide sufficient force to compress the fiber panel 256 within the mold cavity 252.

In certain embodiments, the fiber panel 256 includes a combination of structural fibers and thermoplastic resin. The structural fibers may include natural fibers, such as hemp, wood, flax, kenaf and sisal, and/or synthetic fibers, such as glass fibers, carbon fibers and polymeric fibers. In addition, the thermoplastic resin may include polypropylene (PP), acrylonitrile butadiene styrene (ABS) and/or polycarbonate (PC) binders, for example. By way of example, the fiber panel 256 may be constructed from about 50 percent natural fibers and about 50 percent PP. To facilitate compression forming, the fiber panel 256 is heated (e.g., to about 200 degrees Celsius) to induce the thermoplastic resin to liquefy. The fiber panel 256 is then urged against the first surface 250 of the cavity 252, and compressed between the first surface 250 and the second surface 254 as the second mold element 248 is driven toward the first mold element 246 along the direction 258. As the fiber panel 256 cools within the mold assembly 244, the thermoplastic solidifies, thereby establishing a substantially rigid composite panel that conforms to the shape of the mold cavity 252.

In further embodiments, the fiber panel 256 includes a combination of structural fibers and a thermoset resin. Similar to the embodiment described above, the structural fibers may include natural fibers, such as hemp, wood, flax, kenaf and sisal, and/or synthetic fibers, such as glass fibers, carbon fibers and polymeric fibers. In addition, the thermoset resin may include epoxy resin, polyimide resin, polyester resin and/or vinylester resin, for example. By way of example, the fiber panel 256 may be constructed from Fibrowood, which is manufactured by Johnson Controls Technology Company of Holland, Mich. To facilitate compression forming, the fiber panel 256 is urged against the first surface 250 of the cavity 252, and compressed between the first surface 250 and the second surface 254 as the second mold element 248 is driven toward the first mold element 246 along the direction 258. During the compression process, the panel 256 is heated (e.g., via a heated mold assembly 244), thereby inducing the thermoset resin to cure. Consequently, a substantially rigid composite panel that conforms to the shape of the mold cavity 252 is formed.

In the illustrated embodiment, the first mold element 246 includes trim blades 266 configured to trim the fiber panel 256 to desired dimensions as the fiber panel 256 is compressed within the mold cavity 252. As previously discussed, movement of the second mold element 248 in the direction 258 induces the core 262 to retract upon contact between the core 262, the fiber panel 256, and the first surface 250. As the core 262 retracts, a body of the second mold element 248 continues to move in the direction 258. Contact between the body of the second mold element 248 and the fiber panel 256 drives edges of the fiber panel 256 into contact with the trim blades 266. Further movement of the second mold element 248 in the direction 258 induces the trim blades 266 to penetrate the fiber panel 256, thereby trimming the fiber panel 256 to the desired dimensions. While two trim blades 266 are employed in the illustrated embodiment, it should be appreciated that alternative embodiments may include more or fewer trim blades 266 (e.g., 1, 2, 3, 4, 5, 6, or more). Furthermore, while the trim blades 266 are coupled to the first mold element 246 in the illustrated embodiment, it should be appreciated that at least a portion of the trim blades 266 may be coupled to the second mold element 248 in alternative embodiments. Because the fiber panel is disposed against the first surface 250 of the first mold element 246 before the trim blades 266 penetrate the fiber panel 256, the possibility of the fiber panel being caught on the trim blades 266 is substantially reduced or eliminated. Accordingly, the fiber panel 256 may remain substantially smooth and properly oriented/positioned during the forming process, thereby establishing a strong and/or aesthetically pleasing trim component.

Figure 26:
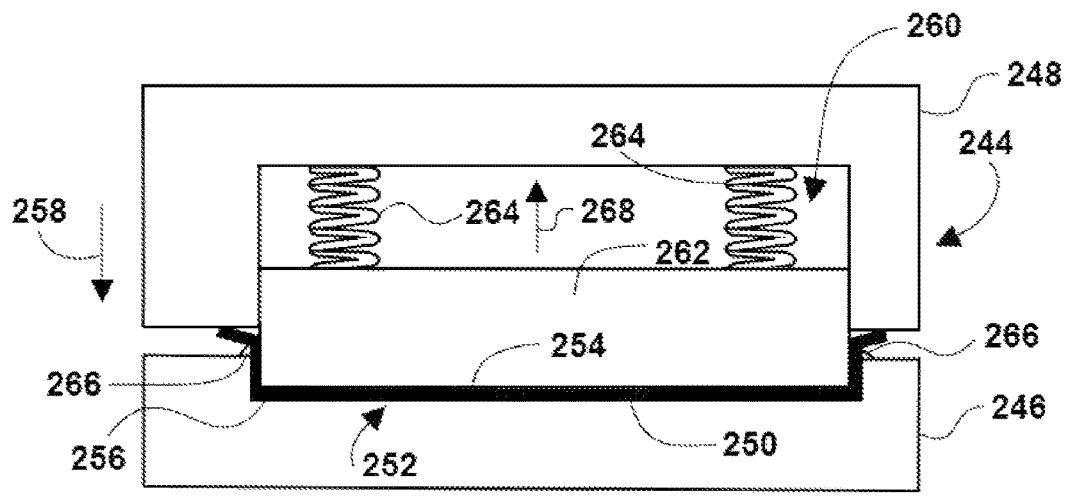
FIG. 26 is a schematic diagram of the mold assembly of FIG. 25, in which a core of the floating core assembly is in an extended position, and the fiber panel is disposed against the surface of the mold element.

FIG. 26 is a schematic diagram of the mold assembly 244 of FIG. 25, in which the core 262 of the floating core assembly 260 is in an extended position, and the fiber panel 256 is disposed against the first surface 250 of the first mold element 246. As previously discussed, movement of the second mold element 248 in the direction 258 drives the core 262 to urge the fiber panel 256 against the first surface 250 of the first mold element 246. Once the second surface 254 is in contact with the fiber panel 256, and the fiber panel 256 is in contact with the first surface 250, further movement of the second mold element 248 in the direction 258 induces the core 262 to move in the direction 268 toward the retracted position. As the core 262 retracts, the biasing members 264 are compressed, thereby increasing the force applied to the core 262. In certain embodiments, the force applied by the compressed biasing members 264 is sufficient to compress the fiber panel 256 into a desired shaped within the mold cavity 252. In addition, as the body of the second mold element is driven in the direction 258, contact between the body and the fiber panel 256 drives edges of the fiber panel 256 into contact with the trim blades 266. Further movement of the second mold element 248 in the direction 258 induces the trim blades 266 to penetrate the fiber panel 256, thereby trimming the fiber panel 256 to the desired dimensions.

Figure 27:
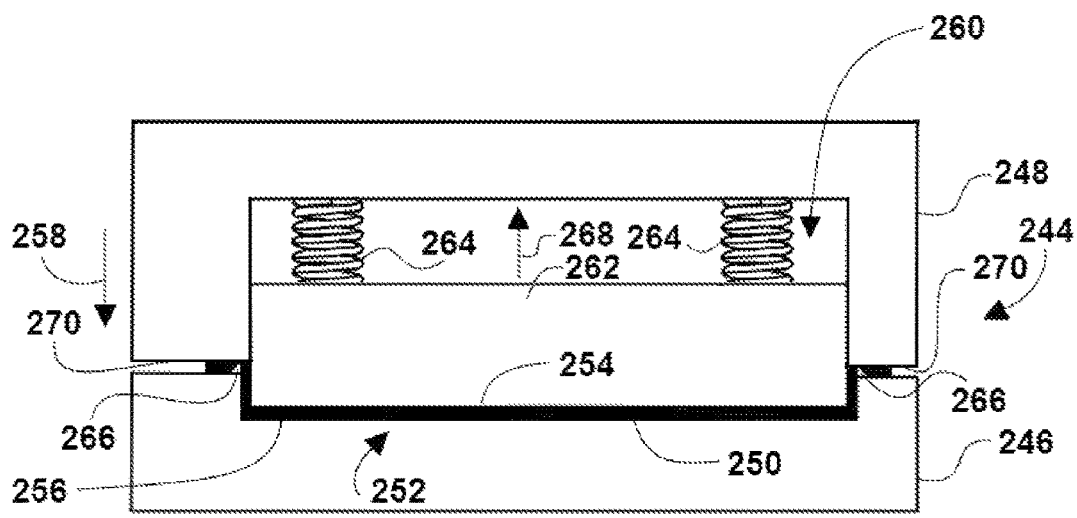
FIG. 27 is a schematic diagram of the mold assembly of FIG. 25, in which the core of the floating core assembly is in a retracted position.

FIG. 27 is a schematic diagram of the mold assembly 244 of FIG. 25, in which the core 262 of the floating core assembly 260 is in a retracted position. With the core 262 in the retracted position, the compressed biasing members 264 urge the core 262 toward the first surface 250 of the first mold element 246 with sufficient force to compress the fiber panel 256 into a desired shape. In addition, a bearing surface 270 of the second mold element 248 drive the fiber panel 256 toward the first mold element 246 such that the trim blades 266 penetrated the fiber panel 256, and trim the fiber panel 256 to the desired dimensions. Because the fiber panel is disposed against the first surface 250 of the first mold element 246 before the trim blades 266 penetrate the fiber panel 256, the possibility of the fiber panel being caught on the trim blades 266 is substantially reduced or eliminated. Accordingly, the fiber panel 256 may remain substantially smooth and properly oriented/positioned during the forming process, thereby establishing a strong and/or aesthetically pleasing trim component.

While only certain features and embodiments of the invention have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A vehicle trim component comprising a fiber panel compression formed into a structural substrate prepared by a process comprising the steps of:
   heating the fiber panel;
   disposing the fiber panel onto a first surface of a mold cavity;
   compressing the fiber panel between the first surface and a second surface of the mold cavity as the fiber panel cools to form the fiber panel into a compression formed component (a) having a shape wherein the shape corresponds to a first contour of the first surface and a second contour of the second surface and (b) comprising an edge providing a thickness of the structural substrate;
   injecting resin into the mold cavity after the compression formed component is formed to fill at least one void between the first surface and the second surface adjacent to the compression formed component and along the thickness of the structural substrate; and
   removing the vehicle trim component comprising the structural substrate from the mold cavity;
   wherein the resin injected into the mold cavity forms a border at the edge of the compression formed component providing the thickness of the structural substrate.

2. The vehicle trim component of claim 1 wherein the process comprises disposing a cover stock onto the vehicle trim component to form a show surface.

3. The vehicle trim component of claim 1 wherein the process comprises trimming at least one edge of the fiber panel to a dimension prior to disposing the fiber panel onto the first surface of the mold cavity.

4. The vehicle trim component of claim 1 wherein the shape of the compression formed component is different than an original shape of the fiber panel.

5. The vehicle trim component of claim 1 wherein the process comprises injecting resin into the mold cavity to fill at least one void between the compression formed component and the first surface to form an ancillary component of the vehicle trim component.

6. The vehicle trim component of claim 1 wherein the process comprises injecting resin into the mold cavity to fill at least one void between the compression formed component and the second surface to form an ancillary component of the vehicle trim component.

7. The vehicle trim component of claim 1 wherein the edge providing the thickness extends about at least a portion of a periphery of the compression formed component such that injecting resin into the mold cavity forms a border disposed about the at least the portion of the periphery of the compression formed component.

8. The vehicle trim component of claim 1 wherein the mold cavity provides dimensional accuracy for the border at the edge of the compression formed component providing the thickness of the structural substrate.

9. The vehicle trim component of claim 1 wherein heating the fiber panel comprises heating a plurality of structural fibers and a thermoplastic resin to a temperature sufficient to liquefy the thermoplastic resin wherein cooling the fiber panel into a compression formed component comprises solidifying the thermoplastic resin.

10. The vehicle trim component of claim 1 wherein the fiber panel comprises edges having variations; and wherein the border of the structural substrate formed from the fiber panel provides dimensional accuracy despite variations in the edges of the fiber panel.

11. The vehicle trim component of claim 1 wherein the fiber panel comprises a plurality of fibers and a thermoplastic resin.

12. The vehicle trim component of claim 11 wherein the fiber panel is heated to a temperature to at least partially liquefy the thermoplastic resin, the fiber panel is disposed onto the first surface of the mold cavity after the fiber panel is heated; the fiber panel is cooled in the mold cavity to solidify the thermoplastic resin and to form the fiber panel into the compression formed component.

13. The vehicle trim component of claim 1 wherein the fiber panel comprises a plurality of fibers and a thermoset resin.

14. The vehicle trim component of claim 13 wherein the mold is heated to cure the thermoset resin and to form the fiber panel into the compression formed component.

15. The vehicle trim component of claim 1 wherein the shape of the compression formed component is different than an original shape of the fiber panel.

16. The vehicle trim component of claim 1 wherein disposing a fiber panel onto a first surface of a mold cavity comprises positioning a cover on the first surface of the mold cavity and disposing the fiber panel on the cover.

17. The vehicle trim component of claim 16 wherein the cover binds to the fiber panel.

18. The vehicle trim component of claim 16 wherein the cover is comprised of at least one of (a) woven fabric, (b) non-woven fabric, (c) an applique, (d) vinyl, (e) foam, (f) foil, (g) leather.

19. A vehicle trim component comprising a fiber panel compression formed in a mold cavity prepared by a process comprising the steps of:
heating the fiber panel;
placing the fiber panel into the mold cavity;
compressing the fiber panel in the mold cavity to form a compression formed component comprising an edge along a periphery and providing a structural substrate having a shape and a thickness along the edge;
injecting resin into the mold cavity with the structural substrate;
wherein the shape of the structural substrate is formed in the mold cavity;
wherein a border of the structural substrate is formed along the thickness of the structural substrate by the resin injected into the mold cavity.

20. A vehicle trim component comprising a fiber panel configured to be compression formed into a structural substrate in a mold cavity comprising a first surface and a second surface prepared by a process comprising the steps of:
heating the fiber panel;
placing the fiber panel into the mold cavity;
compressing the fiber panel between the first surface and the second surface of the mold cavity to form the fiber panel into a compression formed component providing the structural substrate having a shape and thickness along an edge;
injecting resin into the mold cavity with the structural substrate;
wherein the shape of the structural substrate is configured to be formed between the first surface of the mold cavity and the second surface of the mold cavity;
wherein a border is formed on the structural substrate along the thickness at the edge of the structural substrate by the resin injected into the mold cavity.

* * * * *